(12) United States Patent  
Cunningham et al.

(10) Patent No.: US 7,715,669 B2  
(45) Date of Patent: May 11, 2010

(54) FIBER OPTIC LINK, A TRANSCEIVER FOR USE IN THE LINK, AND METHODS FOR DESIGNING AND CONSTRUCTING FIBER OPTIC LINKS AND TRANSCEIVERS

(75) Inventors: David George Cunningham, Dennington (GB); Ronald Kaneshiro, Los Altos, CA (US); Samir Aboulhouda, Cupertino, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 383 days.

(21) Appl. No.: 11/873,550

(22) Filed: Oct. 17, 2007

(65) Prior Publication Data

US 2009/0103927 A1 Apr. 23, 2009

(51) Int. Cl.  
  *G02B 6/28* (2006.01)

(52) U.S. Cl. .......................... 385/24; 385/15; 398/113; 398/135; 398/139

(58) Field of Classification Search ............... 385/15, 385/24; 398/113, 135, 139  
See application file for complete search history.

(56) References Cited

U.S. PATENT DOCUMENTS 5,289,550 A * 2/1994 Plastow ....................... 385/9  
6,175,672 B1 * 1/2001 Newberg et al. ............. 385/24

* cited by examiner

*Primary Examiner*—Jennifer Doan

(57) ABSTRACT

A fiber optic link is provided that uses a relatively low-cost transceiver that incorporates relatively inexpensive low bandwidth optical and electrical components to achieve high data rate operations. The data rate of the fiber optic link can be greater than the data rate of the laser of the transceiver provided the laser meets certain noise requirements; in particular, the relative intensity noise (RIN) of the laser must be low enough to ensure low bit error rate (BER) operation of the link.

24 Claims, 18 Drawing Sheets

FIBER OPTIC LINK, A TRANSCEIVER FOR USE IN THE LINK, AND METHODS FOR DESIGNING AND CONSTRUCTING FIBER OPTIC LINKS AND TRANSCEIVERS

TECHNICAL FIELD OF THE INVENTION

The invention relates to optical fiber links. More particularly, the invention relates to an optical fiber link having a laser-based transceiver and methods for designing such links with the capability of achieving high data rates using relatively low-cost laser-based transceivers.

BACKGROUND OF THE INVENTION

Traditionally, non-equalized, multimode fiber, laser-based, fiber optic links are designed with high bandwidth optical transmitters and receivers. This ensures that the dominant cause of inter-symbol interference (ISI) is the optical fiber used for connecting the transmitter and receiver, and not the receivers or transmitters. Usually, the longest link length for proper operation is then determined based on a target maximum ISI penalty. In standards-based fiber optic links, the maximum ISI penalty is usually in the range 3 to 4 optical decibels (dB).

At high data rates such as, for example, 10 Gigabits per second (Gb/s), it is difficult to manufacture, with high yield and low cost, laser-based transceivers using the traditional design methodology. There are many reasons for this, some of which are (1) the difficulty and precision required to ensure high quality signal paths within the transceiver, (2) the difficulty in yielding high data rate optical components of the transceiver, and (3) the high cost associated with testing the components of the transceiver.

Recently, newly specified equalization-based, multimode fiber links have been designed to operate on low bandwidth fiber that creates deep frequency notches or nulls in the Nyquist frequency interval. These links are required to be capable of operating over the maximum distances possible. Therefore, the length of the fiber is a limiting factor on the bandwidth of the link. However, because low bandwidth fiber is used for these links, in order to ensure proper operation, these transceivers incorporate very complex equalizers and high bandwidth optical components, which increase the cost of the transceiver. Although these transceivers are expected to be generally cost effective for their intended applications, they are still relatively expensive compared to lower bandwidth transceivers and are difficult to manufacture, yield and test.

There is a growing need for low cost transceivers and fiber optic links that are capable of operating at high data rates, without the length of the fiber being a limiting factor on the bandwidth of the links. To address this need, new methods of designing laser-based links must be developed.

SUMMARY OF THE INVENTION

The invention provides a fiber optic link, a transceiver for use in the link, and methods of designing and constructing the link and the transceiver. The method for designing the fiber optic link comprises selecting a type of optical fiber to be used in the link based at least in part on whether a fiber of a particular type has an optical bandwidth that is sufficient for the intended particular data rate of the fiber optic link to ensure that the fiber itself will not be a limiting factor on the data rate of the link, determining a length of the selected fiber type to be used based at least in part on an effective modal bandwidth of the selected fiber type and on the data rate that the link is intended to have, and constructing first and second transmitters and first and second receivers for first and second transceivers, respectively, of the link. As part of constructing at least the first transmitter, the type of laser to be used in at least the first transmitter is selected based at least in part on whether a type of laser has a sufficiently low relative intensity noise (RIN). The particular data rate intended for the fiber optic link being designed is higher than the data rate specified for the laser of the selected laser type that is included in at least the first transmitter.

The method for constructing the link comprises constructing at least a first transmitter of a first transceiver and at least a second receiver of a second transceiver, and optically coupling opposite ends of a first optical fiber to the first transmitter of the first transceiver and to the second receiver of the second transceiver. As part of constructing at least the first transmitter, the type of laser to be used in the first transmitters is selected based at least in part on whether the type of laser has a sufficiently low RIN. The first optical fiber is of a type that is selected for use in the link based at least in part on whether the fiber of the particular type has an optical bandwidth that is sufficient for the intended particular data rate of the fiber optic link to ensure that the fiber itself will not be a limiting factor on the data rate of the link. The length of the first optical fiber is selected based at least in part on an effective modal bandwidth of the selected fiber type and on the particular data rate the link is intended to have. The particular data rate intended for the fiber optic link being designed is higher than the data rate specified for the laser of the selected laser type that is included in at least the first transmitter.

The invention also provides an adaptive equalizer comprising an input port for receiving a signal to be equalized, a filter component coupled to the input port and receiving the signal received at the input port, a delay line element coupled to the filter and receiving the filtered signal output from the filter, an output port coupled to the delay line element for outputting the delayed signal from the equalizer, an error signal generation component coupled to the delay line element, and an equalizer control component coupled to the error signal generation component and to the delay line element. The filter filters the received signal and outputs a filtered signal that is received by the delay line element. The delay line element delays the filtered signal based on a first control signal received by the delay line element and outputs a delayed signal, which is output from the equalizer at the output port. The error signal generation component coupled to the delay line element receives the delayed signal and processes the delayed signal in error signal generation circuitry to produce an error signal. The error signal generation component outputs the error signal, which is received by the equalizer control component. The equalizer control component receives the error signal output from the error signal generation component and processes the received error signal to produce the first control signal that is received by the delay line element. The equalizer control component also generates and outputs a second control signal, which is received by the error signal generation component. The error signal generation component disables and enables the error signal generation circuitry based on a state of the second control signal.

These and other features and advantages of the invention will become apparent from the following description, drawings and claims.

DETAILED DESCRIPTION OF AN ILLUSTRATIVE EMBODIMENT

In accordance with various embodiments that will be described herein, a fiber optic link is provided that uses a relatively low-cost transceiver that incorporates relatively inexpensive low bandwidth optical and electrical components to achieve high data rate operation. In addition, the length of the optical fiber used in the link is not a limiting factor on the bandwidth of the link, although the specified optical bandwidth per unit length for a given type of fiber will be a limitation on how long the fiber of the link can be, as will be described below in detail. Furthermore, the data rate of the fiber optic link can be greater than the data rate of the laser of the transceiver provided the laser meets certain noise requirements; in particular, the relative intensity noise (RIN) of the laser must be low enough to ensure low bit error rate (BER) operation of the link. Prior to describing all of the various aspects of the various embodiments of the invention in detail, the optical link design method of the invention will be generally described.

Figure 1:
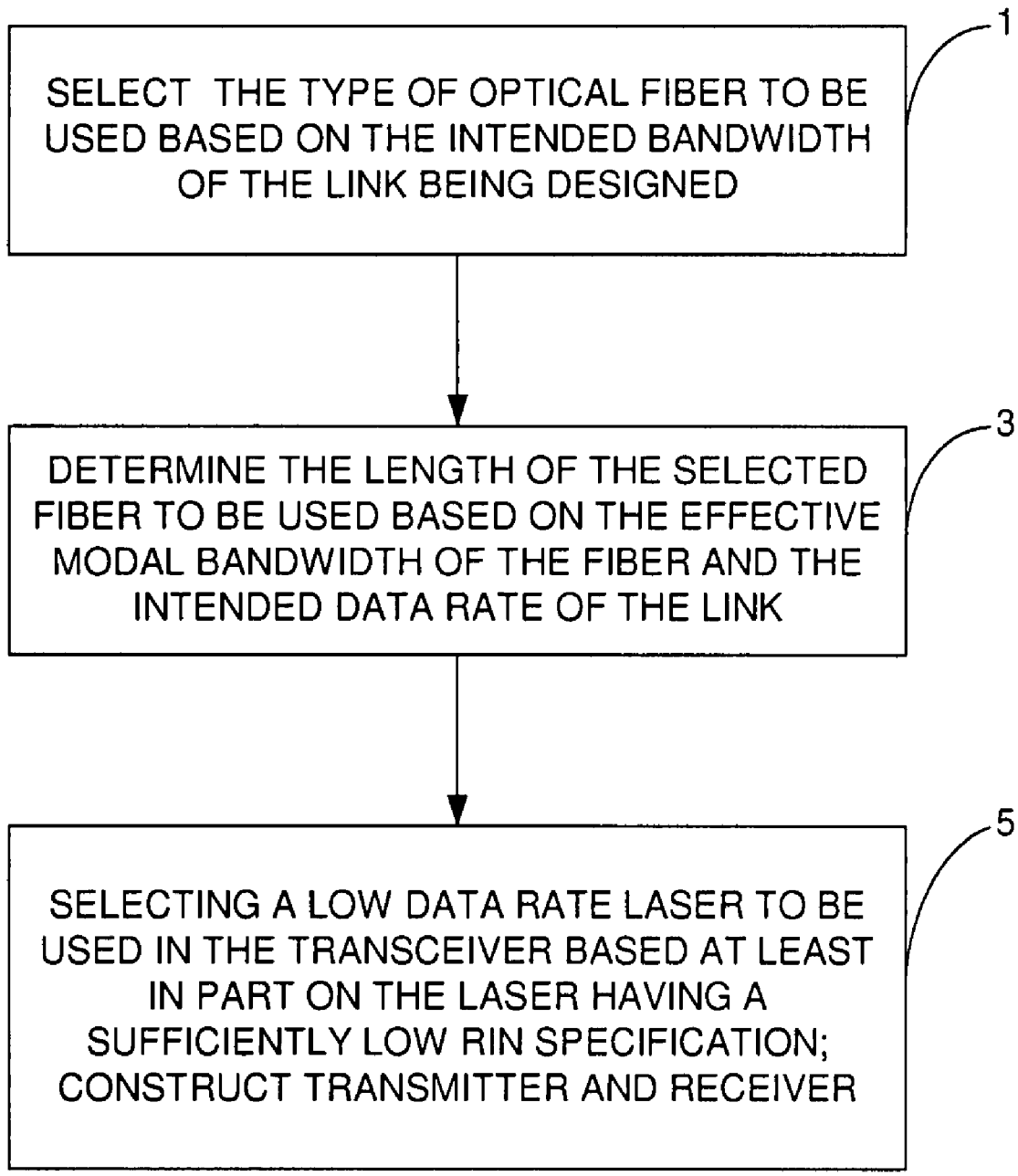
FIG. 1 illustrates a flowchart that represents the method in accordance with an embodiment for designing and constructing a fiber optic link.

FIG. 1 illustrates a flowchart that represents the method in accordance with an embodiment for designing a fiber optic link. The order in which the blocks are shown in the flowchart does not necessarily represent the order in which the corresponding steps are performed. The type of optical fiber to be used for the link is selected based on the intended bandwidth of the link being designed, as indicated by block 1. This ensures that the fiber will not be a limiting factor on the intended bandwidth of the fiber optic link. For example, assuming it is intended that the link will have a bandwidth of 10 Gb/s, a fiber that has a bandwidth range that is sufficient for a data rate of 10 Gb/s will be selected. As is typical when designing fiber optic links, it is assumed that a fiber that has a bandwidth that is 0.75 times the data rate of the link will have sufficient bandwidth for the intended data rate of the link. Thus, in this example, a fiber that has a bandwidth of 7.5 Gb/s will be sufficient. A suitable fiber for this purpose is fiber selected from the class of multimode fibers designated by the International Organization of Standards (ISO) as OM3 multimode fiber.

Having selected the fiber, the length of fiber that can be used is determined, as indicated by block 3. The length of the fiber is determined based on the effective modal bandwidth (EMB) of the fiber and the desired data rate of the link being designed. Standards-based links typically require that the inter-symbol interference (ISI) penalty be no greater than 3 or 4 dB, which corresponds to the EMB. Assuming the data transmission rate of the link is represented by a variable, B, in order to be able to transmit non-return-to-zero (NRZ) data over the fiber with a maximum ISI penalty of 3 dB, it is generally accepted in the industry that the optical bandwidth of the link in hertz should be higher than approximately 0.7B. Normally, the 3 dB optical EMB of multimode fiber is specified as a bandwidth-distance product in units of hertz (Hz) times kilometers (km).

Therefore, the approximate maximum length, $L_{max}$, of fiber that meets the requirement of 0.7B is given by: $L_{max}=EMB/(0.7B)$. For lasers having centre wavelengths near 850 nm, OM3 multimode fiber has an EMB for laser launch of 2 GHz·km. Assuming for exemplary purposes that B equals 10 Gb/s, the maximum length of fiber that can be used to connect the transmitter and receiver is given by: $L_{max}=2$ GHz.km/$(0.7*10$ Gb/s$)=0.286$ km.

In order to ensure that the laser or receiver or both can be very low data rate components, it is also important to ensure that there are no deep nulls within the frequency response in the Nyquist bandwidth of the fiber, which in this example ranges from 0 Gb/s to approximately ½B, or 5 Gb/s. The simplest way to ensure this is to dramatically reduce the length of the fiber below $L_{max}$. For example, selecting the length of the fiber to be equal to $L_{max}/2$ would ensure that there are no deep nulls within the frequency response in the Nyquist bandwidth of the fiber. This also helps to ensure that the equalizer in the transceiver can be a low-complexity and low-power equalizer, as will be described below in more detail. Other techniques can be used to select the length of the fiber to be less than $L_{max}$, but the approach given above is straightforward and provides suitable results.

It should be noted that although the embodiments described herein are directed to multimode fibers, the invention applies equally to single mode fibers. Also, single mode fibers are not often thought of as having an EMB, and so specification spreadsheets for single mode fibers often do not specify EMB. Single mode fiber is typically thought of as having an effective bandwidth due to chromatic dispersion, which the spreadsheets typically do specify. The term EMB, as that term is used herein, is intended to denote effective modal bandwidth when used in connection with multimode fibers and to denote simply effective bandwidth due to chromatic dispersion when used in connection with single mode fiber.

Similarly, although the embodiments described herein are directed to duplex fiber optic links, the invention applies equally to simplex fiber optic links as well as to parallel optical channel links, which may be either parallel optical fiber-based links and/or wavelength division multiplexer (WDM)-based links. In a simplex fiber optic link, there may be only a single transmitter and a single receiver such that only one-way communications is provided from the transmitter to the receiver. In contrast, in parallel optical fiber links, the transmitter of the transceiver will typically have several lasers (e.g., 12 or 24) that communicate in parallel over several optical fibers with a transceiver in which the receiver has several photodiodes (e.g., 12 or 24) for detecting the light produced by the respective lasers. Some or all of the laser and photodiodes may be enabled. Therefore, the term "transceiver", as that term is used herein, is intended to denote a device that has a single transmitter having one or more lasers, a device that has a single receiver having one or more photodiodes, and a device that has both a transmitter and a receiver regardless of the number of lasers and photodiodes that are included in the transmitter and receiver, respectively.

Before or after the type of fiber and length of fiber to be used have been determined, the type of laser that will be used in the transmitter of the transceiver is selected, and the transmitter and receiver are constructed, as indicated by block 5. Low noise optical and electrical components with lower bandwidth than optical and electrical components normally used for the data rate of interest are incorporated into the transmitter and receiver of the invention. It is commonly known that equalizers can be incorporated into receivers to correct ISI introduced by optical link components. For example, it is known to perform equalization of optical links by incorporating a transversal filter-based equalizer in the receiver of the link. However, while the receiver of the invention preferably uses some sort of equalization, as will be described below in detail, the design methodology of the invention makes it possible to use a relatively low-cost and low-power equalizer in the receiver as well as a low bandwidth laser in the transmitter and still achieve a high bandwidth link.

Because RIN determines the maximum signal-to-noise ratio (SNR) of the transmitted signal, the RIN dictates the minimum BER that can be achieved. Therefore, in order to be able to use a low data rate laser in the transmitter, great care should be taken to ensure that the RIN of the laser is low enough to enable the equalized link to operate at the desired BER. The reason for this is as follows. With the known equalization techniques described above, the primary need for performing equalization in the receiver is to correct ISI introduced by the optical fiber itself. In that situation, the RIN spectrum is attenuated by the fiber as a function of frequency by the same amount as the transmitted data signal. Therefore, when the equalizer corrects the ISI, the RIN is simply restored to approximately the same level it had at the output of the transmitter before transmission over the fiber. In other words, the equalizer has no significant effect on the RIN.

In contrast, when a low data rate laser is used for an equalized link in accordance with the invention, the primary source of ISI is the low data rate laser. Therefore, the RIN power spectrum is not significantly frequency attenuated by the high bandwidth fiber used for the link. This means that in addition to correcting the ISI, the equalizer may significantly amplify or enhance the level of the RIN. The enhanced RIN will typically result in a higher minimum BER. Thus, in accordance with the invention it has been determined that in order to reduce the minimum BER to an acceptable or target level, the low data rate laser that is selected for use in the transmitter should have a specified RIN that is approximately the same as that of a higher data rate laser that would normally be used for data transmission at the higher data rate over a non-equalized link. This is very important because if a low data rate laser is used that has a specified RIN that is too high, then the equalized data signal will not meet the target or required minimum BER.

As stated above, if the low data rate laser used in the transmitter has a specified RIN that is as low, or approximately as low, as that of a higher data rate laser that would normally be used to achieve the intended data rate in a non-equalized link, then the laser will provide the intended results if some equalization is used in the transmitter and/or in the receiver. However, there are other ways in which it can be determined whether a specified RIN of a low data rate laser is sufficiently low such that the laser is suitable for the link. In addition, it is possible to use a low data rate laser that has a higher RIN if, in addition to employing equalization in the receiver, a forward error correction code is used in the transmitter, as will be described below in more detail.

After the transmitters and receivers of the transceivers have been constructed, the transceivers are connected to opposite ends of the two separate lengths of fiber. The fiber ends are typically secured to a plug or connector that is shaped and sized to mate with a receptacle (not shown) of the transceiver such that when the plug or connector is mated with the receptacle, the end of the fiber held within the plug or connector is optically aligned with the optics system of the transceiver. Thus, an output optical fiber is coupled to the transmitter of the transceiver on one end of the fiber and to the receiver of an identical or similar transceiver on the opposite end. Likewise, an input optical fiber is coupled to the receiver of the transceiver on one end of the fiber and to the transmitter of an identical or similar transceiver on the opposite end.

As part of the process of constructing the transmitter and receiver of the link (block 4 in FIG. 1), a power budgeting process needs to be performed to ensure that the link will operate properly. As indicated above, because a low data rate laser is used in the transmitter, the receiver is provided with some equalization functionality and the transmitter may be, but need not necessarily be, provided with some equalization functionality. Various embodiments of the transmitter and receiver of the link are described below with reference to FIGS. 4-10 and 18. Because of the equalization functionality in the receiver, or in the receiver and transmitter, the power budgeting process needs to take into account the power penalty incurred due to the equalization functionality.

Figure 2:
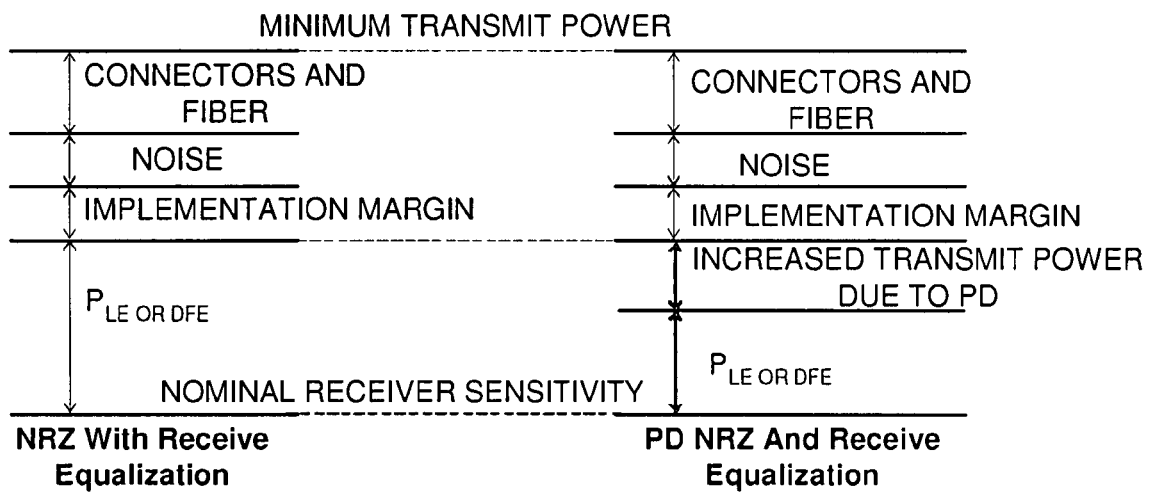
FIG. 2 illustrates a power budgeting diagram for a link that will use the non-return-to-zero (NRZ) transmission protocol.

FIG. 2 illustrates a power budgeting diagram for a link that will use the non-return-to-zero (NRZ) transmission protocol, although the invention applies equally to other types of transmission protocols, as will be described below in more detail. The power budgeting process for the link can be performed in a similar way as is done for the aforementioned known non-equalized links in which the dominant cause of ISI is the fiber itself. Because the link of the invention uses high bandwidth fiber and because the fiber length is set such that no nulls or notches will exist in the Nyquist frequency interval, during the power budgeting calculations, the ISI penalty associated with the fiber itself can be replaced with the power penalty caused by the receiver equalization, or by the combination of the receiver and transmitter equalization.

The left side of the diagram shown in FIG. 2 corresponds to a scenario in which a linear equalizer (LE) or a decision feedback equalizer (DFE) is employed in the receiver, but not in the transmitter. This power penalty is referred to herein as $P_{LE\ or\ DFE}$. The right side of the diagram shown in FIG. 2 corresponds to a scenario in which a LE or DFE is employed in the receiver and in the transmitter. In both scenarios, the diagram illustrates equal power penalties associated with (1) the fiber and the connectors and (2) with noise. The diagram also illustrates an implementation margin that is the same for both scenarios. This margin corresponds to an extra amount of power that is allocated to allow for the fact that real equalizers will not achieve the minimum power penalties possible with ideal equalizers. The required implementation margin or the actual penalties for the equalizer can be estimated by simulation or characterization.

The power penalty, $P_{LE\ or\ DFE}$, associated with the scenario in which an LE or a DFE is only employed in the receiver (the left side of the diagram) is greater than the power penalty, $P_{LE\ or\ DFE}$, associated with the scenario in which an LE or a DFE is employed in the receiver and equalization in the form of pre-distortion (PD) is also employed in the transmitter. This is because in the latter scenario, the transmit power penalty that is incurred due to PD equalization being performed in the transmitter reduces the power penalty that is incurred due to equalization being performed in the receiver. Therefore, the total power penalty associated with equalization being performed in the transmitter and in the receiver is approximately equal to the power penalty associated with equalization being performed only in the receiver.

To illustrate the key functional dependences and parameters involved for an equalized link in accordance with the invention, the power penalties due to ideal equalization and pre-distortion will be described and applied to the principles of the invention. This will demonstrate the manner in which a low data rate laser can be used in conjunction with equalization to enable a high data rate link to be achieved without exceeding the power budget.

It is known that the electrical power penalty due to an equalized receiver is given by the following expression:

$$P_{LE\ or\ DFE} = <1/[|H(f)|^2 + (S_Z(f)/S_A(f))]>_{A\ or\ G} \quad \text{(Equation 1)}$$

where $S_A(f)$ is the power spectrum of the NRZ data, $S_Z(f)$ is the power spectrum of the noise, H(f) is the folded frequency response of the channel, the transmitter and the receiver, $<>_A$ represents the arithmetic mean and applies to an LE, and $<>_G$ represents the geometric mean and applies to a DFE. The data and noise are assumed to be orthogonal, zero-mean, wide-sense stationary, random processes. Because $P_{LE\ or\ DFE}$ approximately equals the gain factor by which the equalizer amplifies the noise at its input, it is sometimes referred to as the noise enhancement factor.

The simplest form of equalizer is an LE that ignores noise and inverts the channel. By inverting the channel, the LE forces the ISI to zero at the decision instant. Hence, such an equalizer is termed a linear zero forcing equalizer (LZFE). This allows the term $S_Z(f)/S_A(f)$ in Equation 1 to be ignored. Consequently, the electrical power penalty for an ideal LZFE ($P_{LZFE}$) can now be expressed as:

$$P_{LZFE} = <1/|H(f)|^2>_A \quad \text{(Equation 2)}$$

For the zero forcing equalizer to exist, the channel must have no nulls in its folded frequency response. Also, if deep notches exist in the channel, the LZFE may suffer an unacceptably large power penalty. Therefore, to allow simple equalization to be used, the combined response of the low bandwidth transmitter and receiver must have no nulls or deep notches in the Nyquist frequency band. Therefore, as part of the process represented by block 5 in FIG. 1, the frequency response of the channel including the analog transmit path, a small length of the selected fiber (e.g., two meters) and the analog receive path should be tested through design or characterization to ensure that there are no nulls or deep notches in the Nyquist frequency band. In addition, using high bandwidth fiber and/or a short enough link length so that the fiber will not introduce notches or nulls in the Nyquist bandwidth ensures that simple equalization circuits will be suitable for use in the receiver, or in the transmitter and receiver.

Although the LZFE ignores noise when it inverts the channel, the total received noise at the decision point after equalization must be low enough to ensure the target bit error rate can be achieved. The total noise will have two major contributions, namely, the RIN of the laser and the enhanced receiver circuit noise due to the LZFE. As indicated above with reference to block 5 illustrated in FIG. 1, to ensure that the laser RIN does not result in a BER that is below the target BER, its RIN specification should be the same as for a normal high bandwidth laser that would normally be used in a non-equalized link. It is not currently recognized in the industry that if low bandwidth lasers are to be used for equalized links, then the lasers must also have a sufficiently low RIN.

Having described the power penalty associated with the receiver equalization, the power penalty associated with using PD equalization in the transmitter will now be described. The folded frequency response due to the channel and PD equalization is given by the following equation:

$$|H_{PD}(f)|^2 = (S_B(f)/S_A(f))|H(f)|^2 \quad \text{(Equation 3)}$$

The term $S_B(f)$ corresponds to the power spectrum of random pre-distorted NRZ data. The power penalty at the receiver due to pre-distorted NRZ data can be calculated by substituting $|H_{PD}(f)|^2$ from Equation 3 for $|H(f)|^2$ in Equation 2. Thus, if the transmit pre-distortion is approximately matched to the channel response, then this reduces the amount of receive equalization required. With pre-distortion that is well matched to the channel, the penalty due to receive equalization is reduced by approximately the amount of extra power that is transmitted due to the pre-distortion compared to the power of the original NRZ signal, as demonstrated by the diagram shown in FIG. 2. Therefore, noise enhancement is reduced by using transmit pre-distortion. The pre-distortion that is performed in the transmitter will typically be sequence shaping or transmit pulse shaping, as will be described below in more detail.

Figure 3:
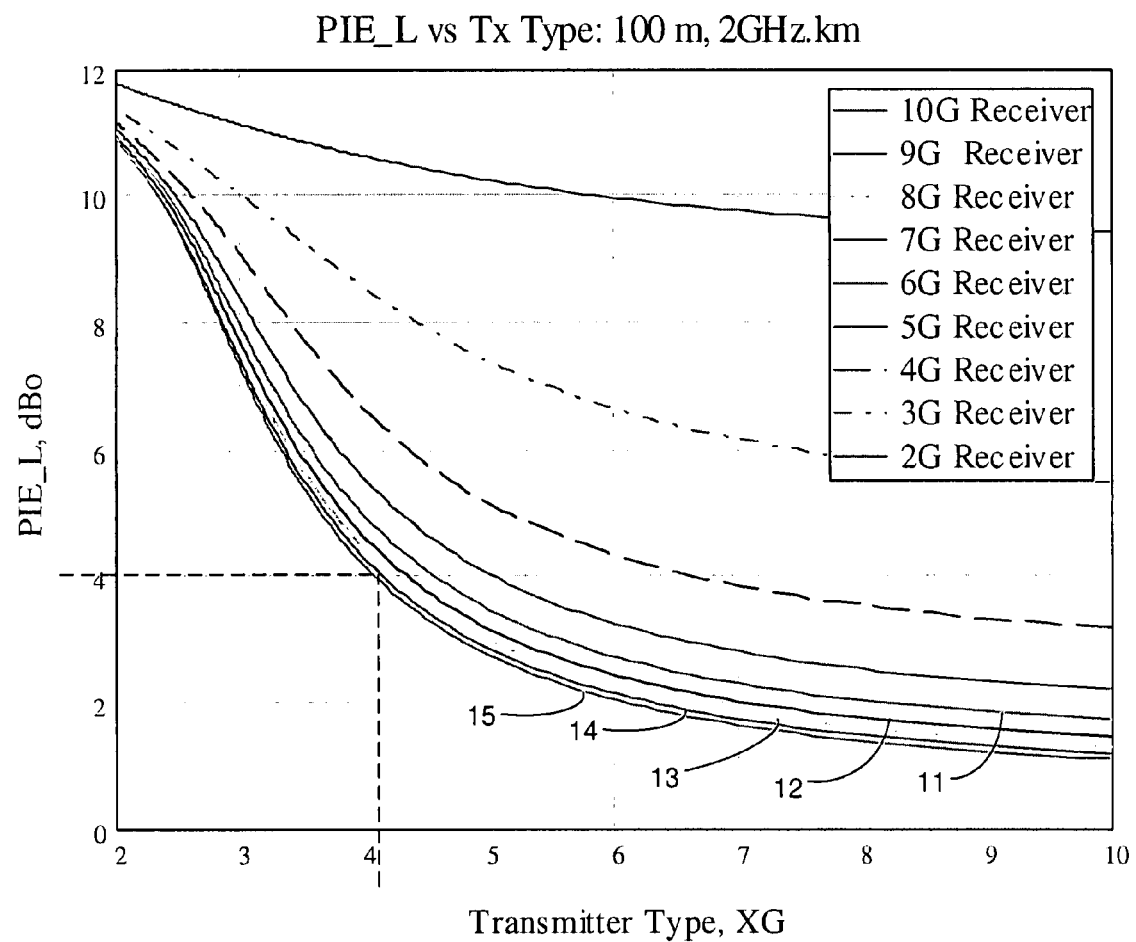
FIG. 3 illustrates a graph that represents the power penalties as a function of transmitter and receiver type when the transmitter and receiver are connected by 100 m of high bandwidth fiber and equalization is applied only in the receiver.

FIG. 3 illustrates a graph that represents the power penalties as a function of transmitter and receiver type when the transmitter and receiver are connected by 100 m of high bandwidth fiber and equalization is applied only in the receiver. The vertical axis represents the power penalties, PIE_L, associated with the equalization applied in the receiver. The horizontal axis represents the data rate of the transmitter and each curve represents a receiver having a particular bandwidth. Curves 11-15 represent receivers having bandwidths of 6 Gb/s, 7 Gb/s, 8 Gb/s, 9 Gb/s, and 10 Gb/s, respectively. For this experiment, VCSELs were used in the transmitters as the lasers. The power penalties were calculated using Equation 1.

The power budget of VCSEL-based optical links would only allow a maximum PIE_L of about 4 dB to be allocated for equalization from a total power budget of about 8 dB. It can be seen from FIG. 1 that for data transmission at 10 Gb/s using a receiver corresponding to curve 15, the lowest data rate of transmitter that can be used is about 4 Gb/s. If a transmitter having a lower data rate than about 4 Gb/s is used, the power needed for equalization will cause the power budget to be exceeded. Because the power penalty associated with the RIN of the laser causes an error rate floor, the maximum power penalty associated with the RIN should not exceed about 1.0 dB. Also, because the power penalty associated with the RIN is in addition to the power penalty associated with equalization, the RIN of the laser should be approximately equal to the RIN of a high data rate laser in order to ensure that the power budget is not exceeded. Of course, this does not mean that the laser used in the transmitter cannot have a lower data rate than about 4 Gb/s if a 10 Gb/s data rate link is trying to be achieved, but rather that care should be taken to ensure that the power budget is not exceeded and that the RIN of the laser must be sufficiently low to enable these goals to be achieved.

FIGS. 4-10 illustrate block diagrams of transceivers having various configurations, all of which are suitable for implementing the principles and concepts of the invention. Typically, identical transceivers will be used on each end of the fiber optic link. Each of the transceivers has certain components that are common to all of the transceivers shown in the FIGS. 4-10. For example, the transmitter of each of the transceivers includes a laser driver 30, a laser 40, and an optics system 50. The receiver of each of the transceivers includes an optics system 60, a photodiode 70, and an amplifier 80, which is typically a transimpedance amplifier (TIA). The transmitter and receiver of the transceiver share a controller 20 that controls the operations of the transceiver. The transceiver may include other components that are common in transceiver modules, such as, for example, clock and data recovery (CDR) circuits that perform CDR on the output of the TIA 80 and a monitor photodiode and feedback circuitry that monitor the output power level of the laser and adjust the laser bias current accordingly.

Figure 4:
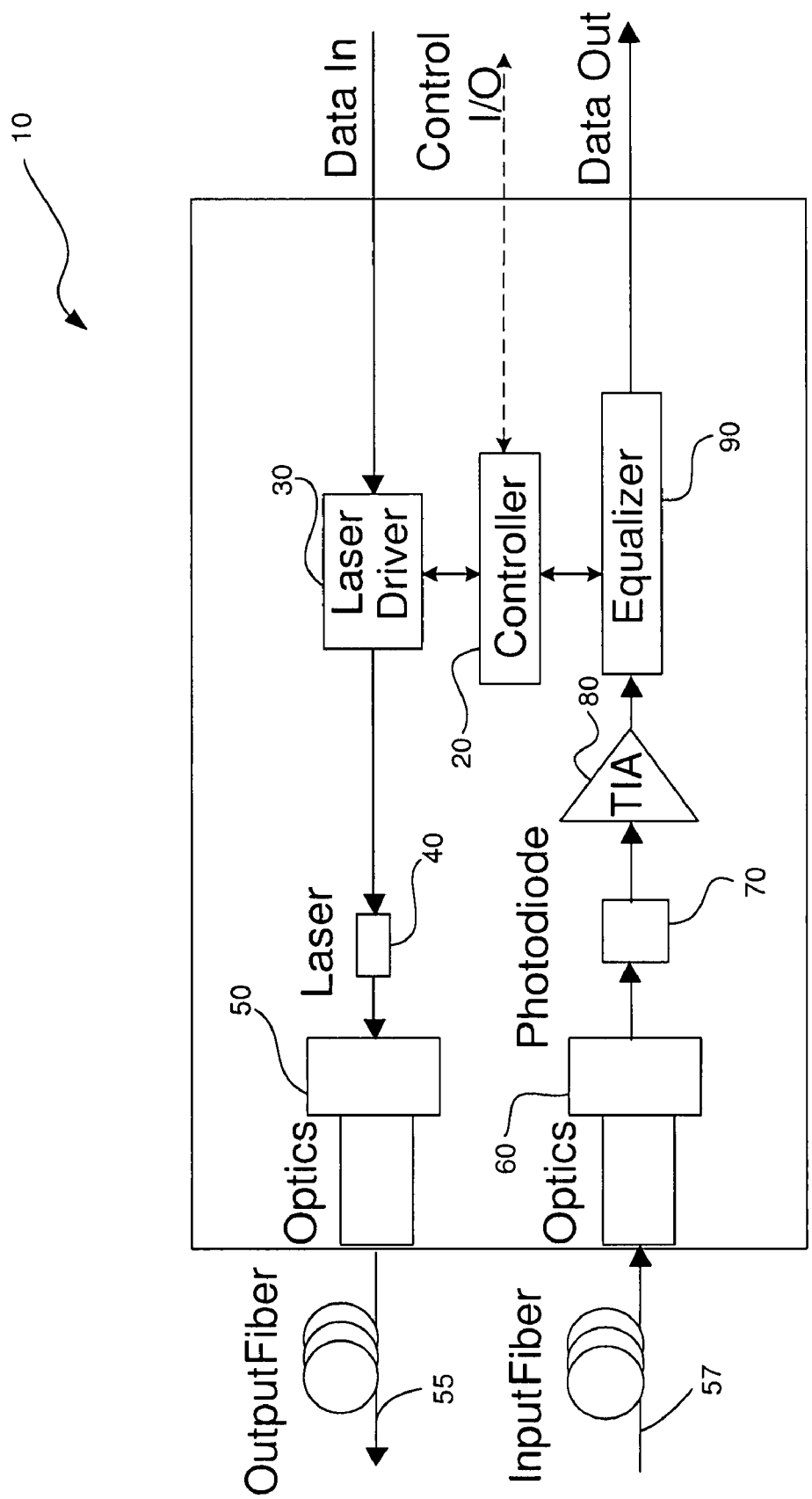
FIGS. 4-10 illustrate block diagrams of transceivers having various configurations, all of which are suitable for implementing the principles and concepts of the invention.

With reference to FIG. 4, in accordance with this embodiment, the transceiver 10 also includes an equalizer 90 in the receiver, but includes no component in the transmitter for performing PD equalization. The equalizer 90 is typically a DFE or an LE, such as, for example, an LZFE. However, the invention is not limited to using any particular type of equalizer in the receiver. A Data In signal received at the input of the laser driver 30 causes the laser driver 30 to produce a modulation signal that monitors the laser 40 to produce a modulated optical signal representing bits of data. The optics system 50 directs the light into the end of an output optical fiber 55 for transmission over the optical fiber 55 to a similar or identical transceiver coupled to the opposite end of the fiber 55. In the receiver of the transceiver 10, an optical signal received over an input optical fiber 57 is directed by the optics system 60 onto a receive photodiode 70, which converts the light it receives into an electrical signal. The electrical signal is amplified by the TIA 80 to produce an amplified electrical signal. The amplified electrical signal is then processed by the equalizer 90 to produce the output data signal, Data Out, of the transceiver 10.

As indicated above with reference to FIGS. 1-3, when constructing the transmitter and receiver of the transceiver, several considerations are taken into account including, for example, the desired bandwidth of the link, the needed RIN of the low bandwidth laser to be used in the transmitter and the power budget of the link. Consequently, the components that are included in the transceiver will vary depending on these and other considerations.

Figure 5:
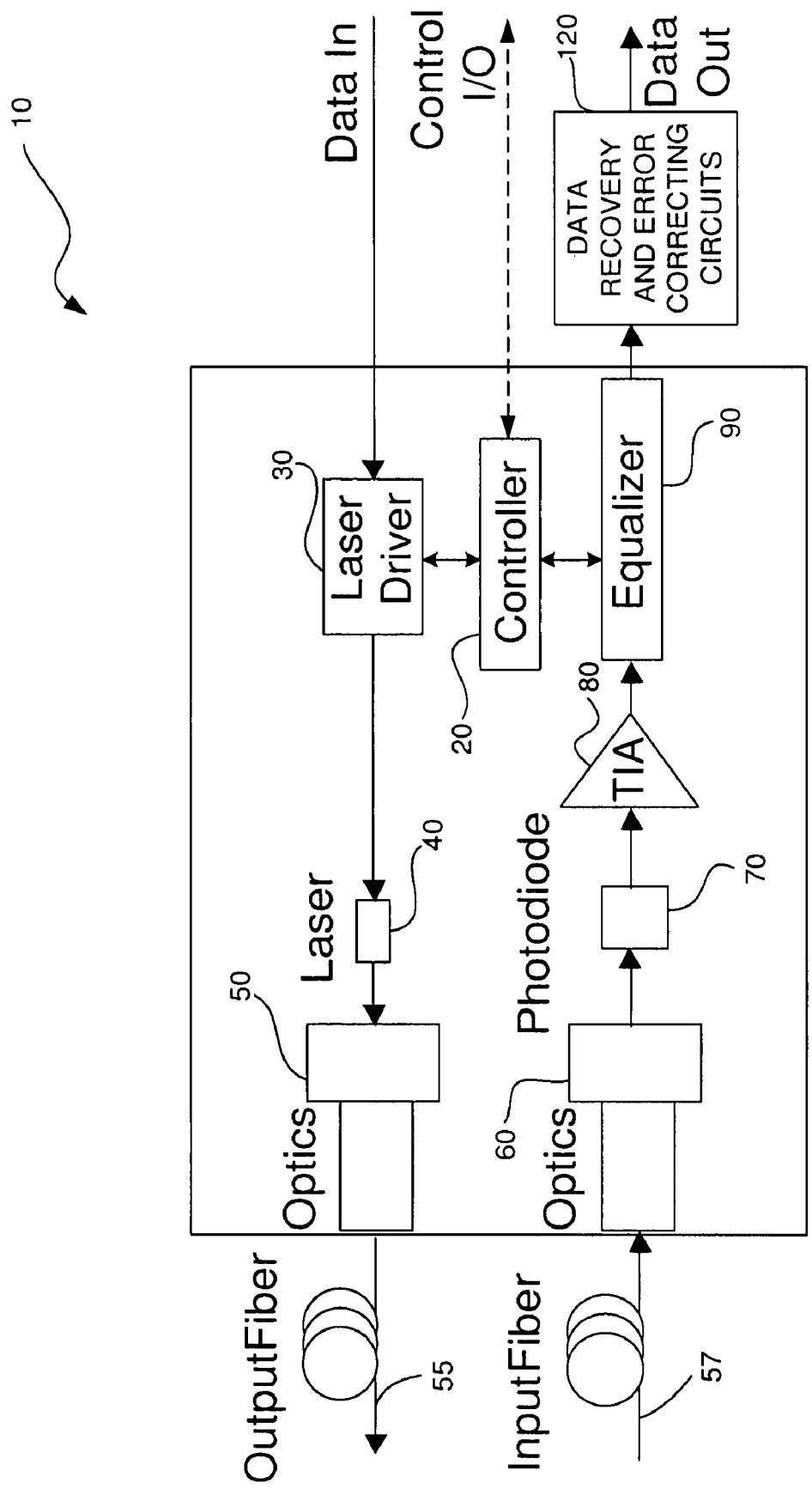

FIG. 5 illustrates a block diagram of the transceiver 10 shown in FIG. 4 except that external to the transceiver 10 are components for performing CDR and error correction 120.

This transceiver configuration is useful, particularly if the low data rate laser cannot be guaranteed to have a sufficiently low RIN to achieve the desired or required BER. In this case, CDR and error correction are applied to enable the desired or required BER to be achieved.

Figure 6:
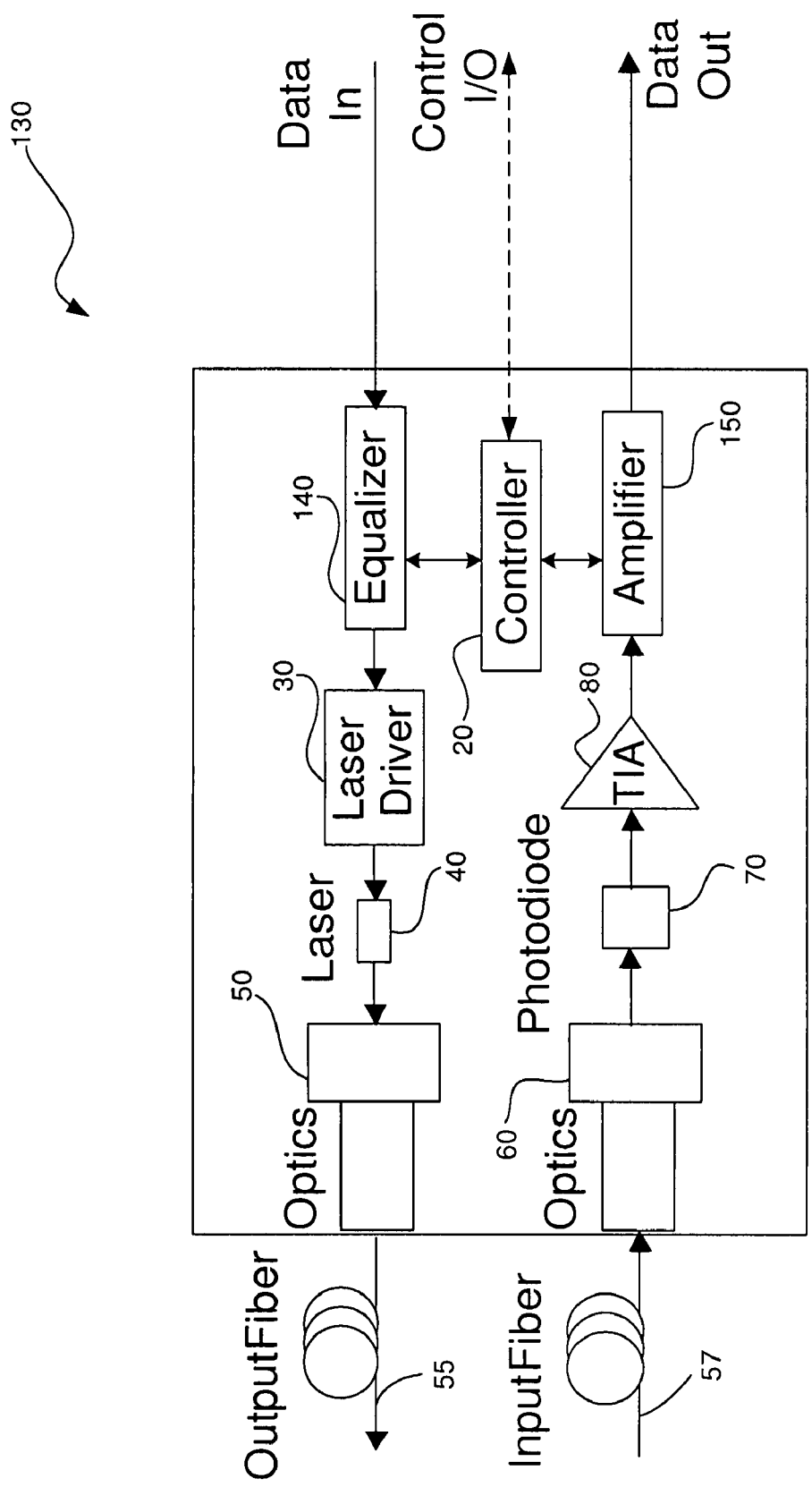

FIG. 6 illustrates a block diagram of a transceiver 130 that includes an equalizer 140 on the transmitter side to predistort the Data In signal that the laser driver 30 uses to drive the laser 40. No equalizer is included in the receiver. The transceiver 130 includes an amplifier 150 that receives the output of the TIA 140 and amplifies it to produce the output data signal, Data Out. This transceiver configuration is useful in that using PD in the transmitter does not enhance the RIN of the laser 40. Therefore, if the laser 40 cannot be guaranteed to have a sufficiently low RIN to achieve the desired or required BER, using the equalizer 140 in the transmitter and the amplifier 150 in the receiver will help ensure that the BER is at an acceptable level. In this embodiment the laser driver 30 is a linear laser driver and the amount of PD that is applied is limited so as not to over drive the laser 40.

Figure 7:
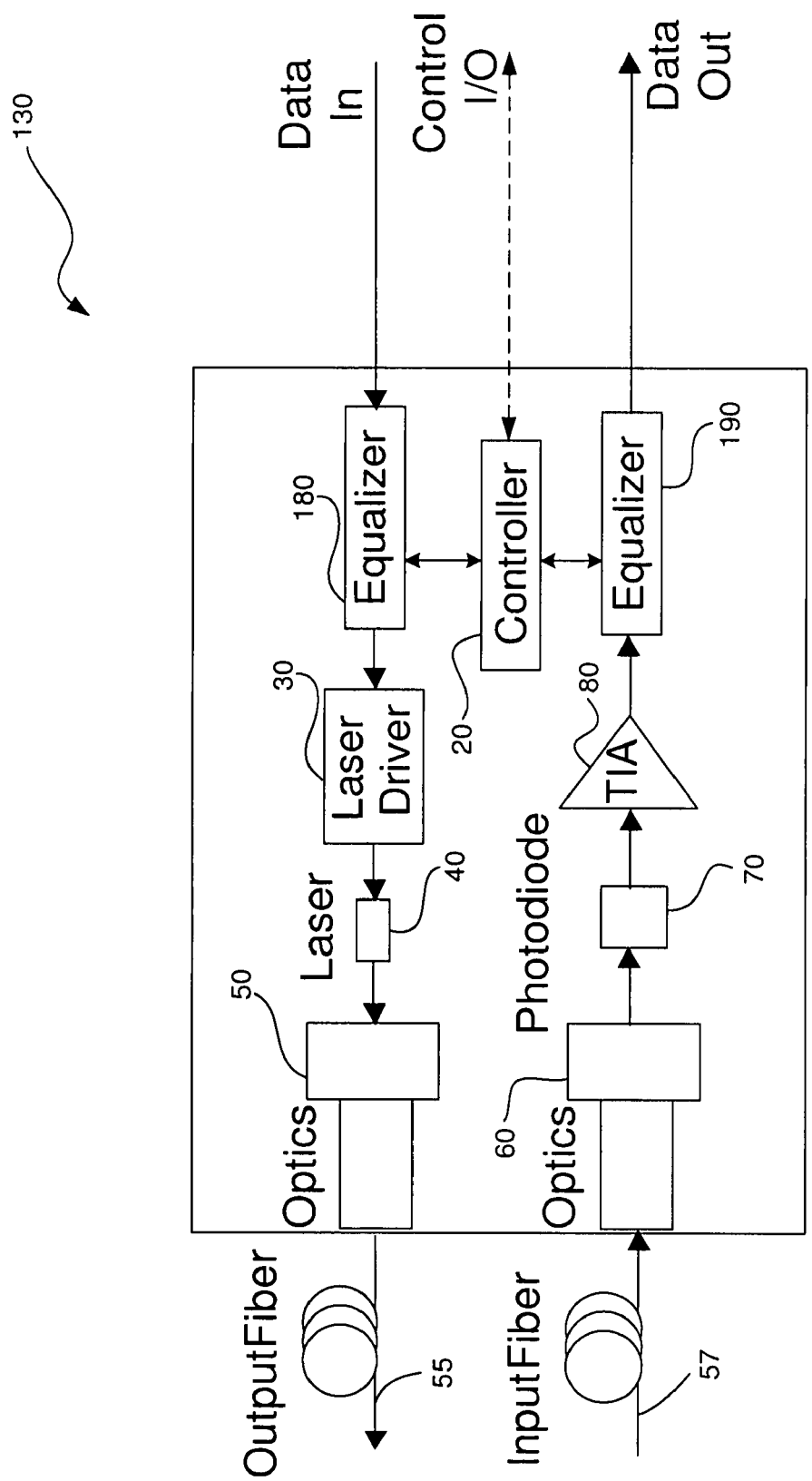

FIG. 7 illustrates a block diagram of a transceiver 170 that includes an equalizer 180 in the transmitter to predistort the Data In signal and an equalizer 190 in the receiver for performing equalization on the output of the TIA 80. As indicated above with reference to FIG. 6, using PD in the transmitter does not enhance the RIN of the laser 40. Therefore, if the laser 40 cannot be guaranteed to have a sufficiently low RIN to achieve the desired or required BER, using the equalizers 180 and 190 in the transmitter and receiver, respectively, will help ensure that the resulting BER is acceptable. Like the embodiment described above with reference to FIG. 6, in this embodiment the laser driver 30 is a linear laser driver and the amount of PD that is applied is limited so as not to over drive the laser 40.

Figure 8:
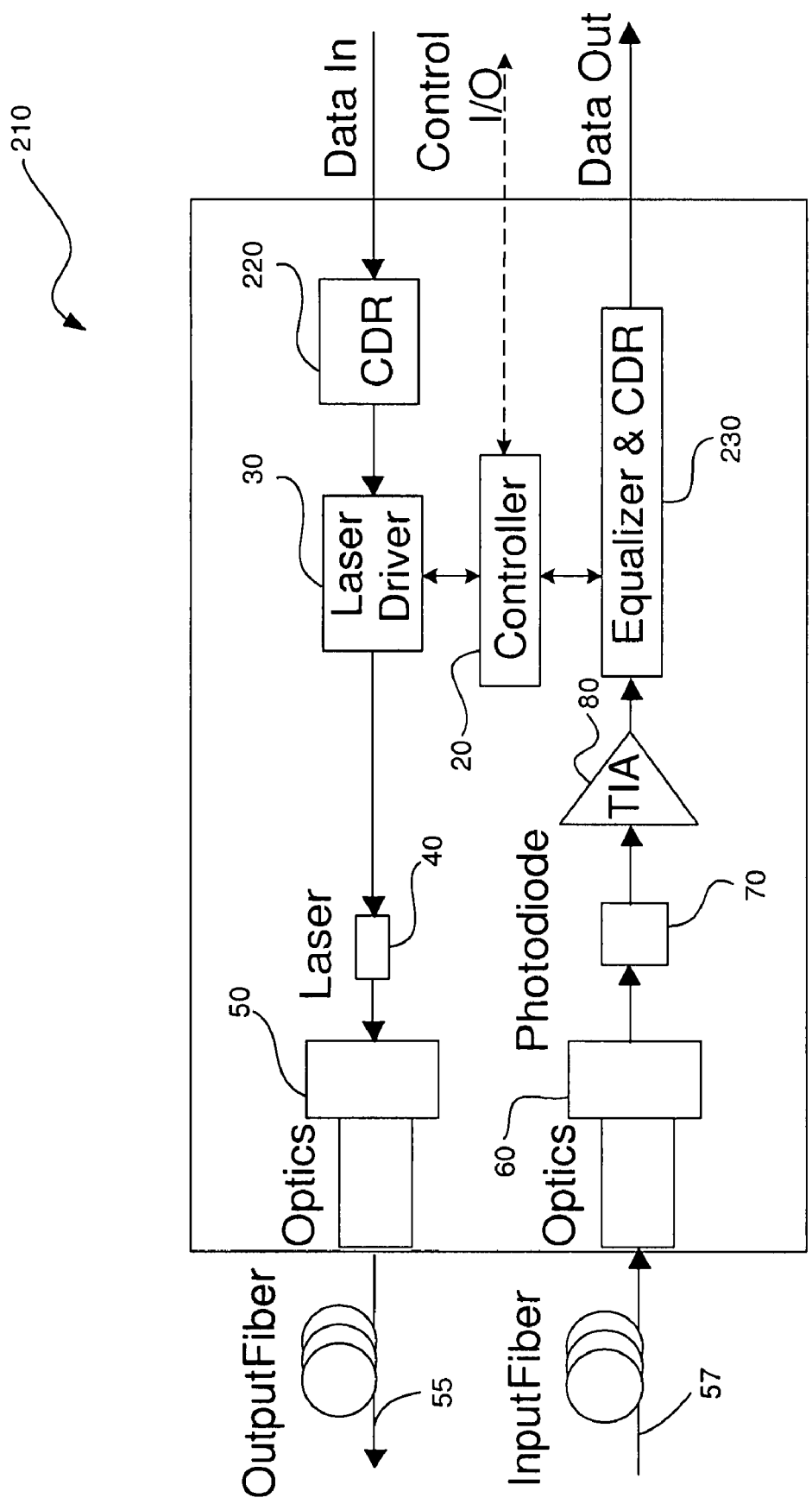

FIG. 8 illustrates a block diagram of a transceiver 210 that includes a CDR circuit 220 in the transmitter that communicates with the controller 20 to perform CDR in order to improve the BER. A combination equalizer and CDR circuit 230 in the receiver also helps improve the BER. Thus, equalization is performed only in the receiver, while CDR is performed in both the transmitter and receiver.

Figure 9:
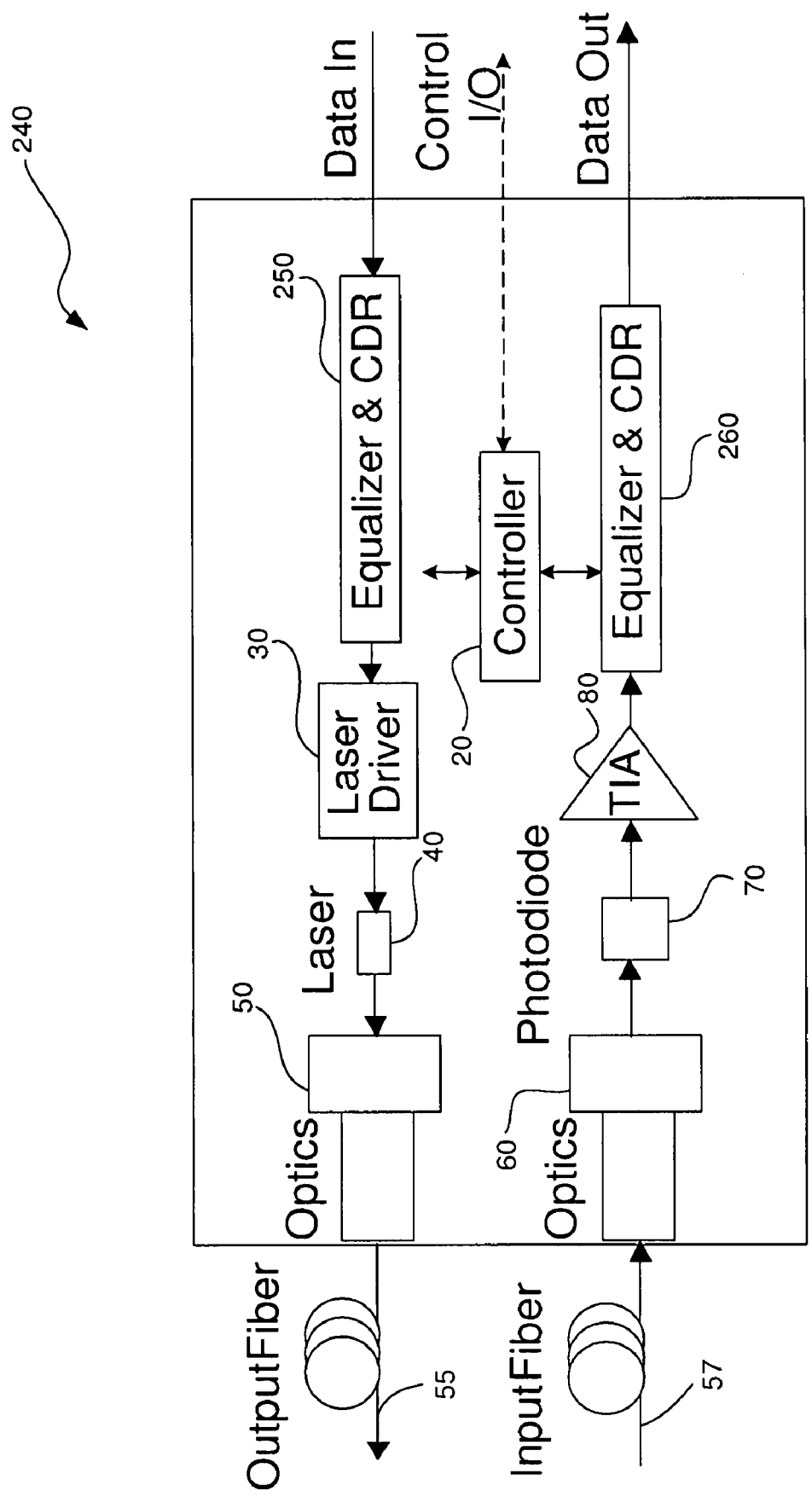

FIG. 9 illustrates a block diagram of a transceiver 240 that includes a combination equalizer and CDR circuit 250 in the transmitter that performs CDR and PD on the Data In signal as well as a combination equalizer and CDR circuit 260 in the receiver that performs CDR and equalization on the output of the TIA 80. Thus, equalization and CDR are performed in both the receiver and the transmitter to improve the BER. Like some of the configurations described above, this transceiver configuration is useful in cases in which the RIN of the low bandwidth laser 40 cannot be guaranteed to be sufficiently low to enable a desired or required BER to be achieved.

Figure 10:
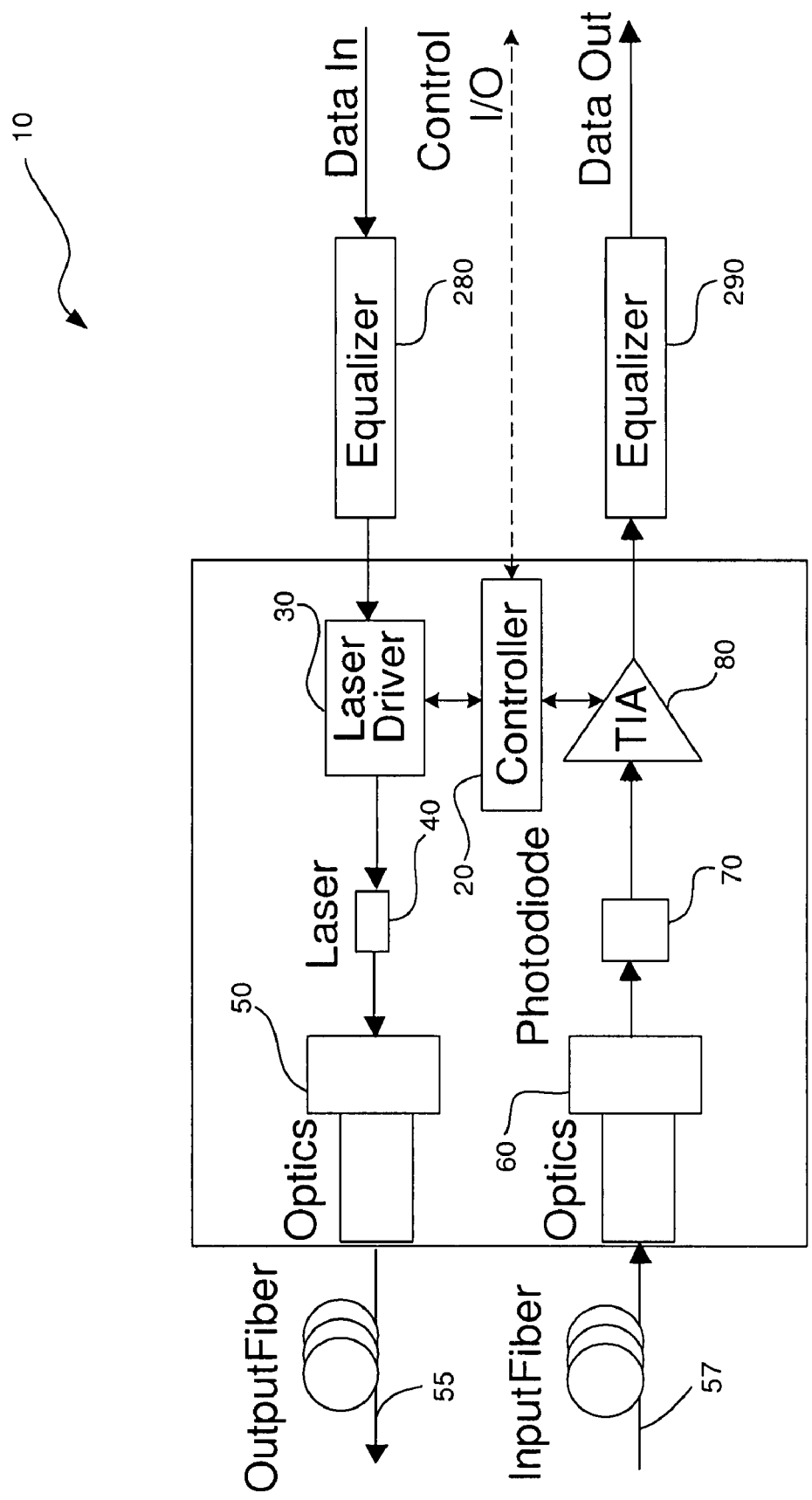

FIG. 10 illustrates a block diagram of a transceiver 270 having equalizer circuits 280 and 290 that are external to the transceiver 270 for performing PD and equalization, respectively, on the Data In signal and on the output of the TIA 80, respectively. In accordance with this embodiment that the laser 40 has been selected to have a RIN that is sufficiently low to guarantee that the desired or required BER will be achieved. If it cannot be guaranteed that the RIN of the laser 40 is sufficiently low, then CDR and error correcting circuitry (not shown) should be placed after the receive equalizer 290.

Figure 11:
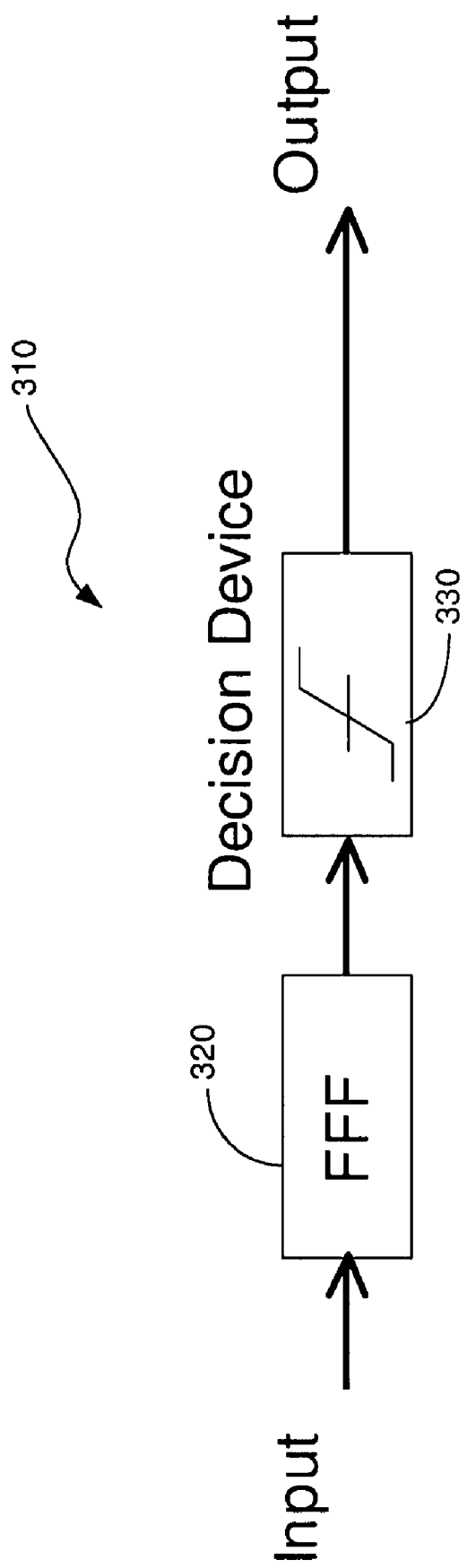
FIG. 11 illustrates a block diagram of a known linear equalizer (LE) that is suitable for use in the receiver of the transceiver for performing receiver equalization.

FIG. 11 illustrates a block diagram of a known LE 310 that is suitable for use in the receiver of the transceiver for performing receiver equalization. The LE 310 has a feed forward filter (FFF) 320 that performs feed-forward filtering of the input signal and a decision device 330 that outputs a decision bit based on the input received from the FFF 320.

Figure 12:
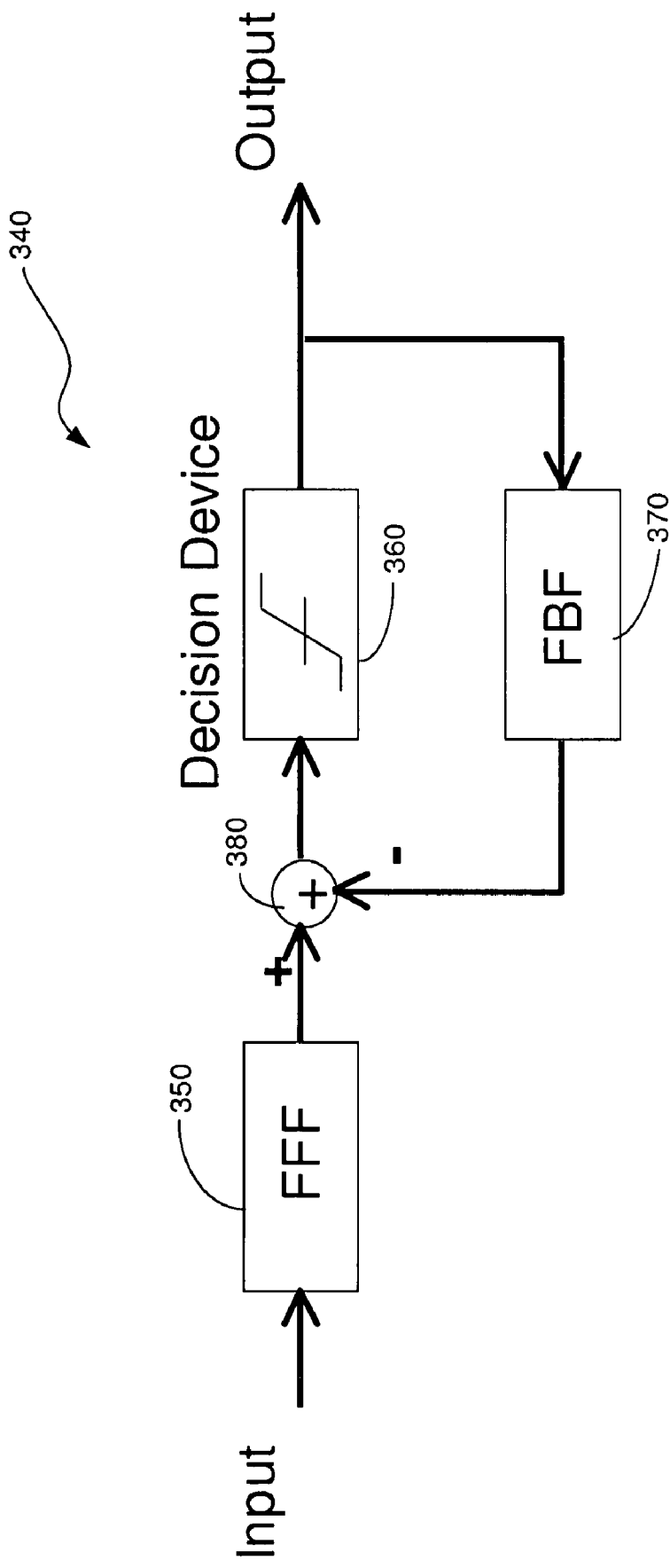
FIG. 12 illustrates a block diagram of a known DFE that is suitable for use in the receiver of the transceiver for performing receiver equalization.

FIG. 12 illustrates a block diagram of a known DFE 340 that is suitable for use in the receiver of the transceiver for performing receiver equalization. The DFE 340 has a FFF 350 that performs feed-forward filtering of the input signal, a decision device 360 that outputs a decision bit based on the input received from the FFF 350 and a feedback filter (FBF) 370 that receives and filters the decision bit and feeds the filtered result back to a summer 380 that subtracts the filtered result from the output of the FFF 350.

Figure 13:
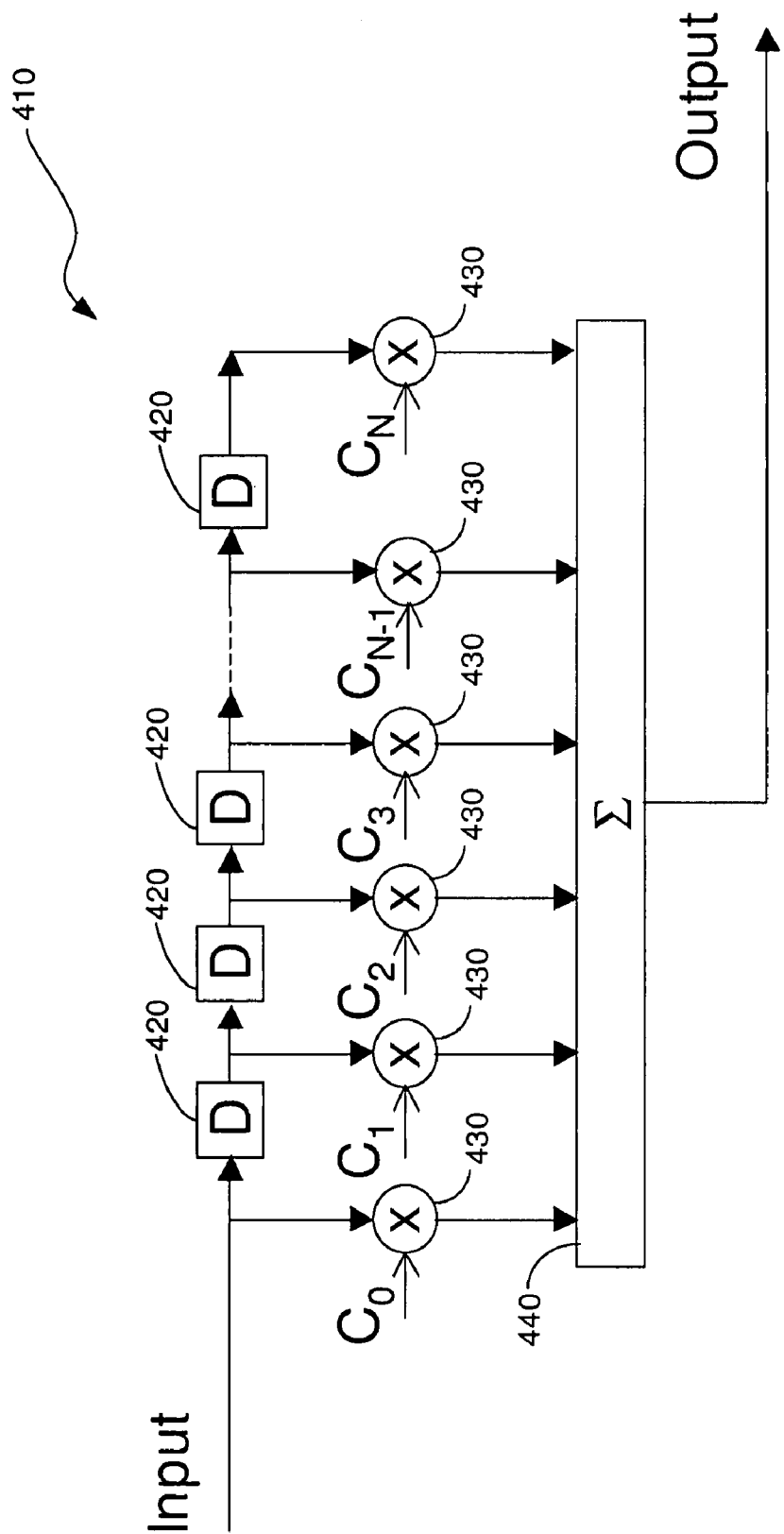
FIG. 13 illustrates a block diagram of a known tap delay line filter that may be used in the LE or decision feedback equalizer (DFE) shown in FIGS. 11 and 12, respectively.

FIG. 13 illustrates a block diagram of a known tap delay line filter 410 that may be used in the LE 310 or DFE 340 shown in FIGS. 11 and 12, respectively, as the FFFs or FBFs shown in FIGS. 11 and 12. The blocks 420 represent delay elements that delay each bit by a delay period, D, that is usually less than or equal to one transmission symbol period. The blocks 430 represent multipliers that multiply each delayed bit by a filter coefficient, C0-CN. The filter response can be changed by changing the filter coefficients. The results of the multiplication processes are summed by a summer 440 to produce the output of the filter.

Figure 14:
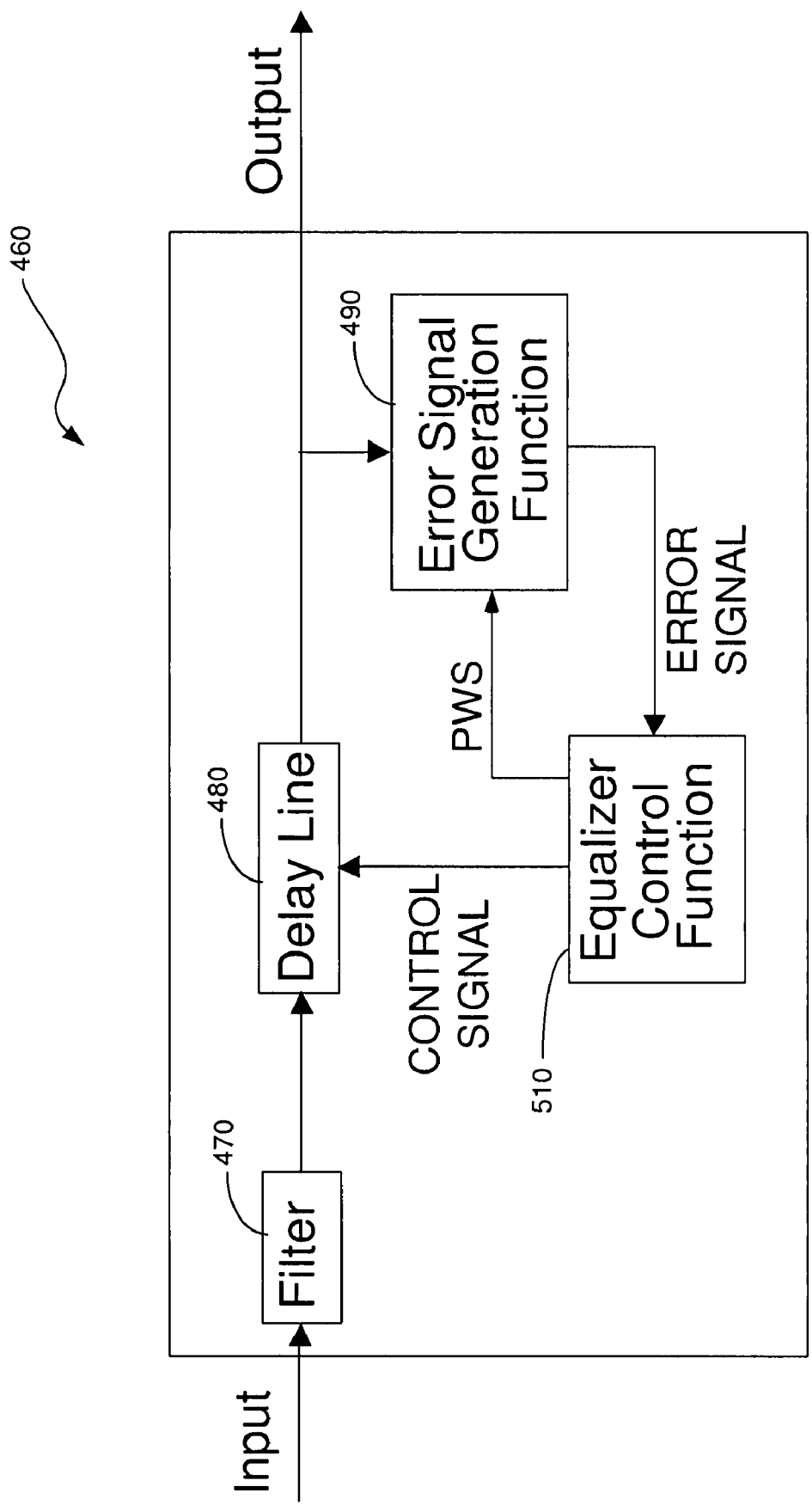
FIG. 14 illustrates a block diagram of a known configuration for an adaptive equalizer that is suitable for use as the receiver equalizer of the transceiver of the invention.

FIG. 14 illustrates a block diagram of an adaptive equalizer 460 that is suitable for use as the receiver equalizer of the transceiver of the invention. The adaptive equalizer 460 includes a filter 470 at its input that is typically a matched filter for analog operations and an anti-aliasing filter for digital implementations. The output of filter 470 is input to a delay line element 480, which delays the signal based on tap settings inside of the delay line element 480. The output of the delay line element 480 is input to an error generation signal circuit 490 that processes the delayed input to produce an error signal. The error signal is input to an equalizer control function circuit 510, which processes the error signal to produce a control signal that controls the frequency response of the delay line element 480 by causing the tap settings in the delay line element 480 to be altered. The control signal adjusts the response of the delay line element 480 until the error signal produced by the error signal generation function block 490 is reaches its minimum value.

Figure 15:
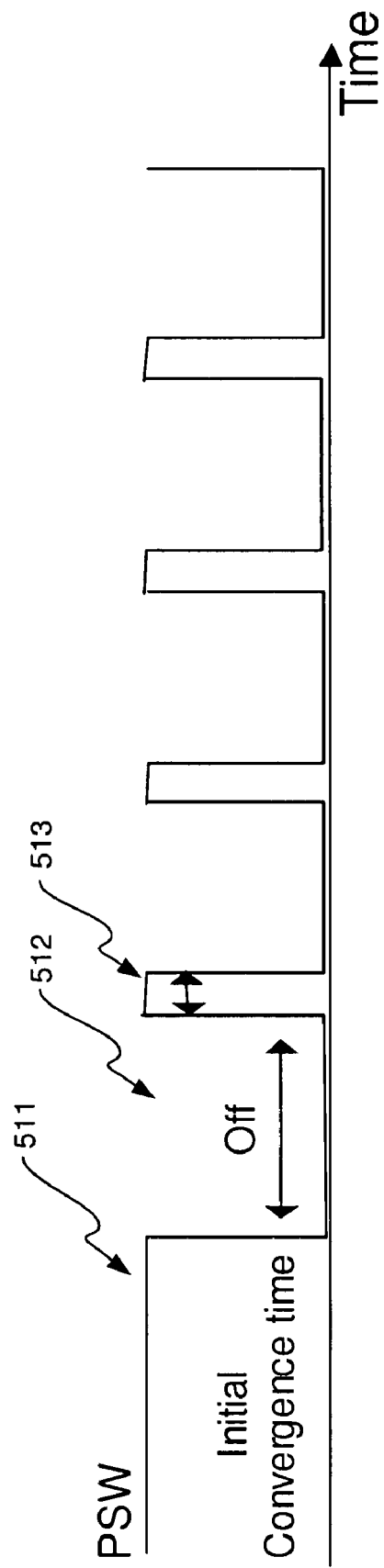
FIG. 15 illustrates a timing diagram that represents the initial convergence time for the error signal output from the error signal generation function block shown in FIG. 14 to reach its minimum value followed by a duty cycle.

The adaptive equalizer 460, in accordance with an embodiment, includes functionality for performing an equalization algorithm that operates in a burst mode to conserver power. FIG. 15 illustrates a timing diagram that represents the operations of the adaptive equalizer 460 when it is configured with the burst-mode functionality. When the transceiver is powered on, either during a calibration mode or during the normal mode of operations, there is an initial convergence time period 511 during which the power switch (PWS) control signal sent from the equalizer control function block 510 to the error signal generation function block 490 is asserted. This initial convergence time period is the amount of time required for the error signal output from the error signal generation function block 490 shown in FIG. 14 to reach its minimum value. At the end of the convergence time period 511, the PWS signal is deasserted for a first predetermined time period 512, after which it is reasserted for a second predetermined time period 513. The PWS control signal is periodically asserted and deasserted to provide a duty cycle. Preferably the time periods 512 and 513 are of constant time durations, although functionality could be added to adaptively vary these time periods to improve or optimize conservation of power. The time period 513 will typically be significantly shorter than the time period 512 in order to conserve power. The time periods 512 and 513 could be varied by new settings being input to the equalizer 460 from the transceiver controller 20.

The equalizer control function block 510 typically will include a state machine (not shown) that controls the time periods 512 and 513, although this could also be accomplished by a processor running some type of executable software. The error signal generation function block 490 typically will include circuitry, such as a state machine or a processor executing software, that receives the PSW signal and performs one or more operations depending on the state of the PSW signal. In particular, when the PSW signal is asserted, the error generation circuitry in block 490 is enabled such that it processes the next input from the delay line element 480 and produces a corresponding error signal, which is then output to the equalizer control function block 510. When the PSW signal is deasserted, this circuitry inside of the error generation function block 490 is disabled so that no new error generation signal is generated. In this state, the most recent value of the error generation signal that was output to the equalizer control function block 510 continues to be output to the equalizer control function block. Thus, during the time periods 512 that the PSW signal is deasserted and the circuitry inside of the error signal generation function block 490 is disabled, the operations of the equalizer 460 are not affected.

As an alternative to performing the burst-mode algorithm entirely inside of the equalizer 460, the equalizer 460 could be configured with an optional mode of operations to enable the transceiver controller 20 to perform a portion of the burst-mode algorithm and deliver the PSW control signal to the error signal generation block 490. This would be beneficial in case in which, for example, it is determined that an error in the state machine in the equalizer control function block 510 has been detected.

In the case where the invention is implemented in an optical link having several parallel channels, such as, for example, in the case where a transmitter includes a plurality of laser diodes and the receiver of the transceiver on the opposite end of the link includes a plurality of photodiodes for receiving the optical signal generated by the respective laser diodes, the error signal output from the error signal generation function block 490 could be used to equalize all of the receiver channels. This would reduce the amount of hardware that is needed to perform receiver equalization for the link.

Having described the various ways in which the invention may be implemented, an example of an actual fiber optic link that has been built and tested will now be described to demonstrate one example of an actual implementation of the principles and concepts of the invention. For this example, two OM3 fibers each having a maximum length of 100 m were used to connect the receivers and transmitters of the transceivers. These are high bandwidth fibers such that any notches that occur are well beyond the Nyquist frequency of ½T, where T is the transmission symbol period. As described above with reference to block 3 in FIG. 1, the length of the fiber to be used is determined based on the EMB of the fiber and the desired data rate of the link being designed. The EMB for this fiber is 2 GHz·km. The intended bandwidth of the link was 10 Gb/s. Using the equation described above to calculate the fiber length results in a maximum fiber length of 0.286 km, or 286 meters. However, by reducing the maximum length that the fibers can have to 100 m, it is further ensured that no deep notches or nulls will exist in the frequency response of the fiber in the Nyquist bandwidth.

The maximum RIN_OMA of the transmitter laser was selected to be approximately −128 dB/Hz. The maximum transmit (20-80) % rise-fall time was approximately 70 picoseconds (ps). The optical receiver (PIN photodiode and TIA) bandwidth was chosen to be approximately 7.5 GHz at 3 dB.

The equalizer that was used in the receiver was a continuous time tapped delay line equalizer of the type described above with reference to FIG. 13 that was operated in accordance with the burst mode adaptive algorithm described above with reference to FIG. 15. The transceiver package style was SPF+.

Figure 16:
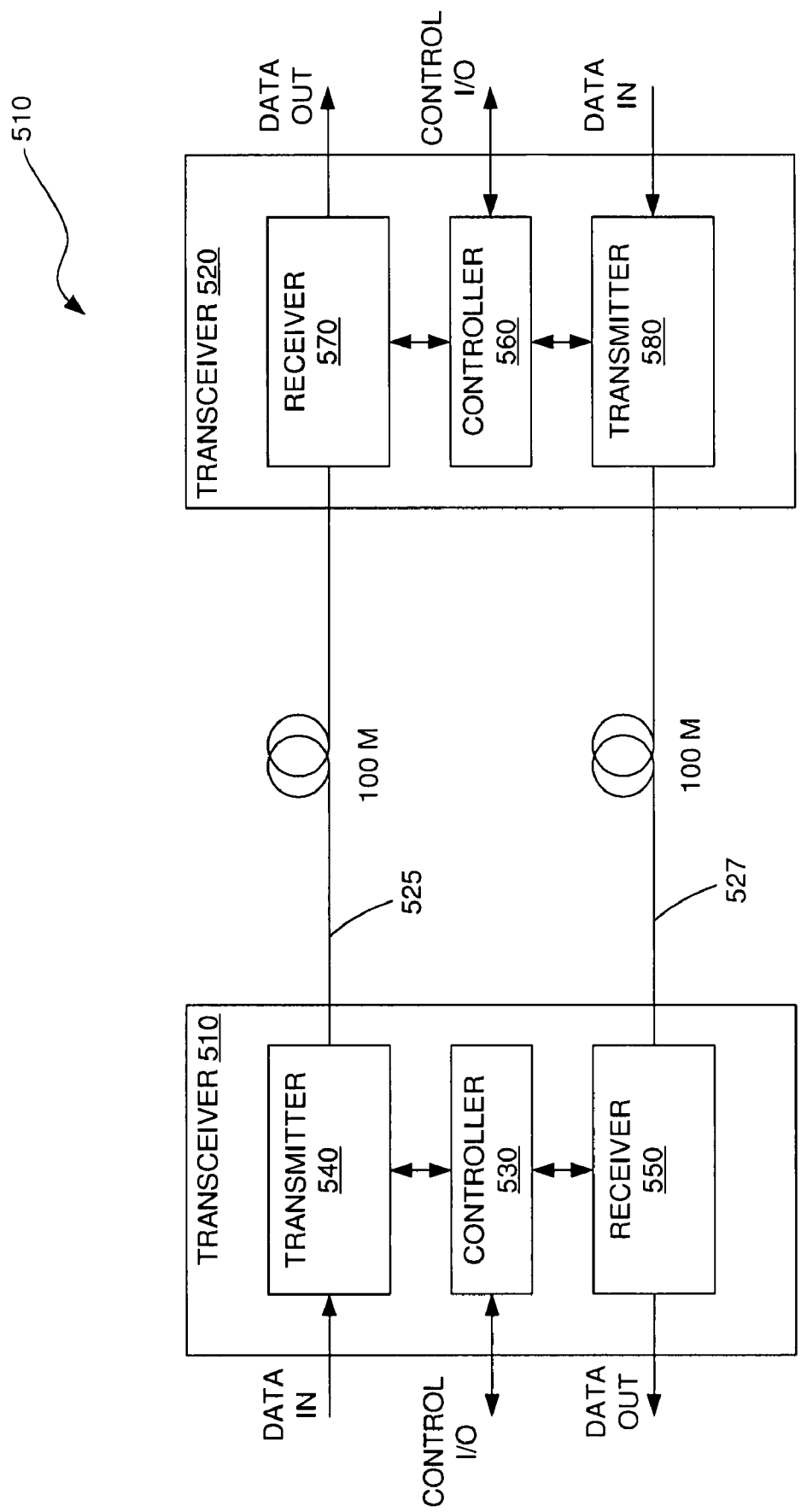
FIG. 16 illustrates a block diagram of a link that was built and tested in accordance with the principles and concepts of the invention.

FIG. 16 illustrates a block diagram of the link 500 that was built and tested, which includes a transceiver 510, a transceiver 520, and optical fibers 525 and 527 with connectors (not shown) for connecting the fibers 525 and 527 to receptacles (not shown) of the transceivers 510 and 520. The transceivers 510 and 520 were each constructed to have the configuration illustrated in FIG. 8. The transmitter 540 of the transceiver 510 is coupled by fiber 525 to the receiver 570 of the transceiver 520. The receiver 550 of the transceiver 510 is coupled by fiber 527 to the transmitter 580 of the transceiver 520. The transmitter 540 and receiver 550 of the transceiver 510 are both controlled by a controller 530. Likewise, the transmitter 580 and receiver 570 are both controlled by a controller 560.

Figure 17:
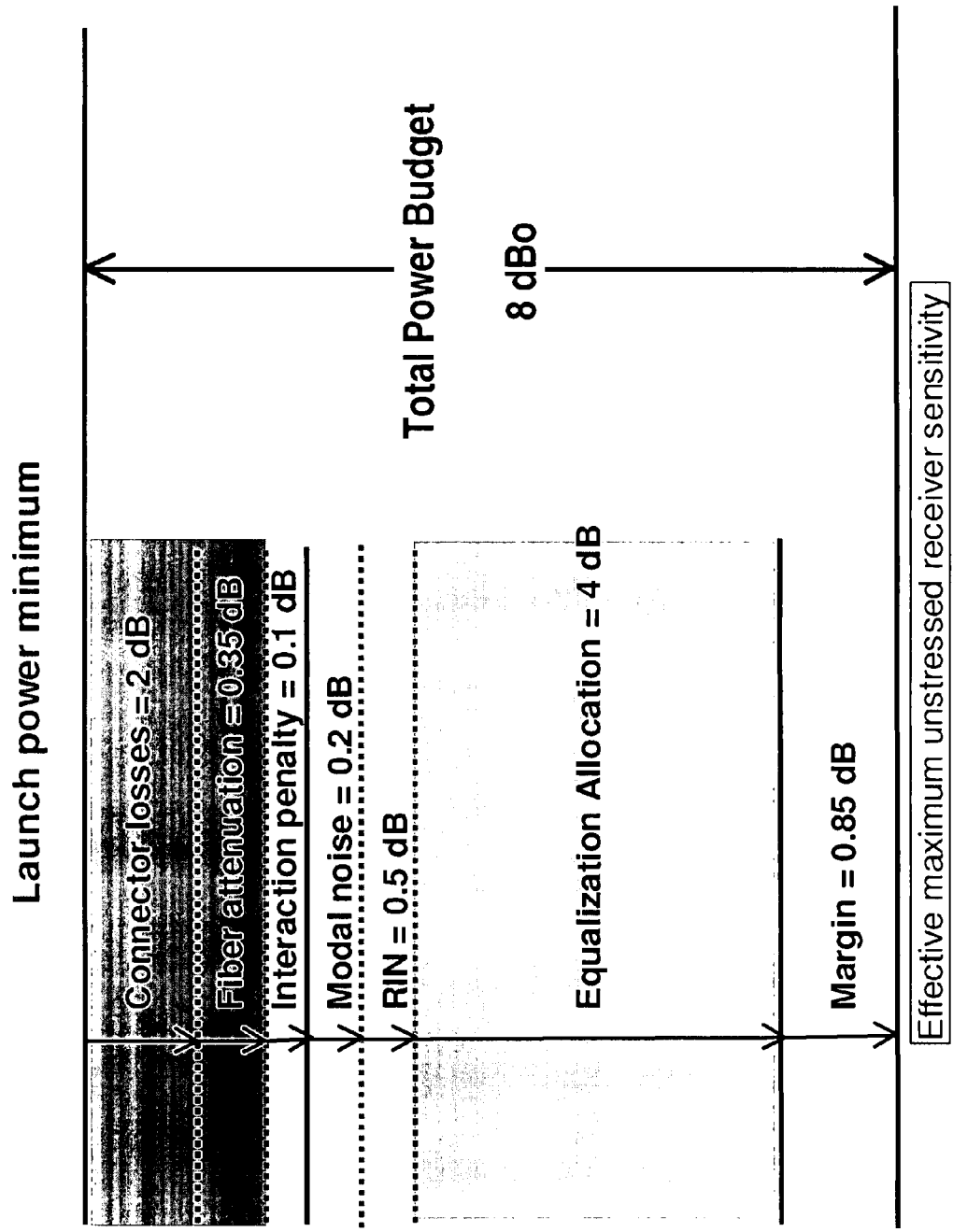
FIG. 17 illustrates a power budget diagram for the link shown in FIG. 16.

FIG. 17 illustrates a power budget diagram for the link 500 shown in FIG. 16. The total power budget was 8 dBo. A margin of 0.85 dB was allocated to allow for non-idealities of the equalizers used in the receivers 550 and 570. For this experiment, no equalization was used in the transmitters 540 and 580. A CDR circuit 220 (FIG. 8) was used in the transmitters 540 and 580, but the CDR circuits were optional and so were configured so that they could be disabled. A power penalty of 4 dB was allocated to equalization. Using a laser having rise-fall time of 70 ps and a maximum RIN_OMA specification of −128 dB/Hz resulted in a power penalty due to RIN of about 0.5 dB. A power penalty of 2 dB was allocated for connector losses and a power penalty of 0.35 dB was allocated for fiber attenuation. A power penalty of 0.2 dB was allocated for modal noise and an interaction power penalty of 0.1 dB was allocated.

The link worked as expected and achieved a data rate of 10 Gb/s using low data rate lasers in the transmitters. One of the advantages of the approach described above is that the cost of the link is substantially reduced, primarily due to the significantly lower cost of the low data rate laser as compared to the high data rate laser that would normally have been used to achieve the desired 10 Gb/s data rate for the link. Because a low data rate laser is used, this makes it possible to use other low bandwidth optical and electrical components in the transmitters and receivers, which also reduces costs. Another advantage is that the relatively low yield and high costs associated with manufacturing and testing high data rate lasers and other high bandwidth components are avoided. Thus, the invention satisfies a growing need for lower cost, higher data rate links that, prior to the invention, were not available.

Figure 18:
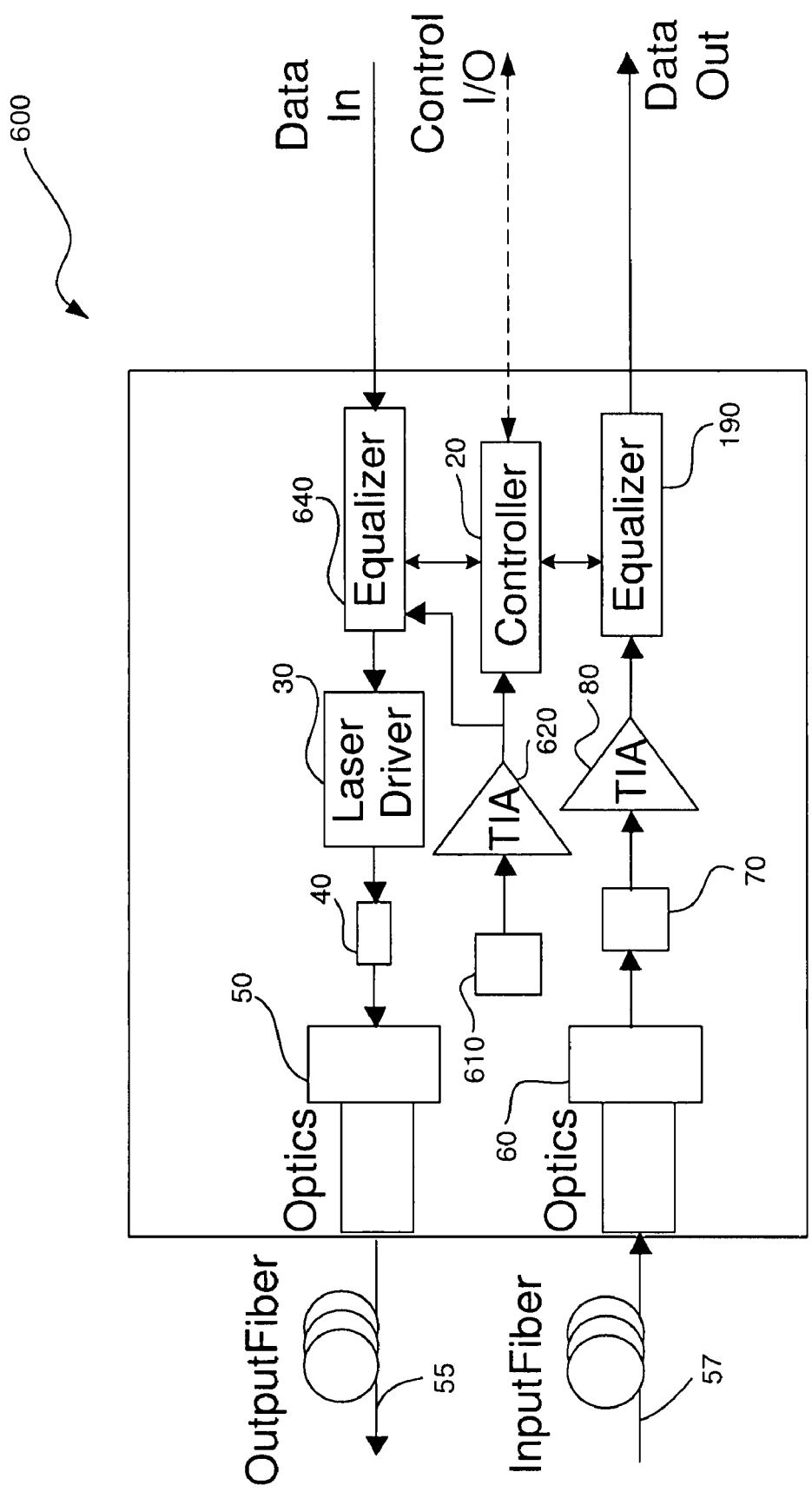
FIG. 18 illustrates a block diagram of a transceiver in accordance with an embodiment in which a high speed monitor photodiode is used to monitor the laser output power level as well as to control transmit equalization.

If equalization is used in the transmitter of the transceiver, the output of the monitor photodiode may be used to control the transmit equalization, or pre-distortion. The monitor photodiode is usually a low speed monitor photodiode because it is only used to measure the average output power level of the laser. FIG. 18 illustrates a block diagram of the transceiver 600 in accordance with an embodiment in which a high speed monitor photodiode is used for this purpose and for the purpose of controlling the transmitter equalizer. The transceiver 600 is identical to the transceiver 130 shown in FIG. 7 except that the transceiver 600 includes a high speed monitor photodiode 610 and a high speed amplifier 620. Components in FIGS. 7 and 18 that are identical are labeled with the same reference numbers.

The high speed monitor photodiode 610 may be of the type commonly used in high speed receives, such as a PIN diode. Likewise, the amplifier 620 may be of the type commonly used in high speed receivers, such as a TIA. The high speed monitor photodiode 610 is fast enough to convert a portion of the modulated light produced by the laser 40 into an electrical signal having the same modulation rate. The high speed amplifier 620 is fast enough to detect and amplify the high speed electrical signal output from the photodiode 610 and produce a high speed amplified electrical signal that is output from the amplifier 620. The signal output from amplifier 620 is received by the controller 20 and by the transmitter equalizer 640. The controller 20 processes the signal to obtain the average output power level of the laser, which it then uses in the normal manner to adjust the bias current delivered by the laser driver 30 to the laser 40.

The transmitter equalizer 640 may have the configuration shown in FIG. 14, for example. Either inside of the equalizer 640 or external to it, a delay element is used to introduce a small time delay into the signal output from the TIA 620 to compensate for any difference in path length between the path from the photodiode 610 to the error signal generation function block 490 (FIG. 14) of the equalizer 460 and the path from the equalizer input to the error signal generation function block 490. The error signal generation function block 490 would then generate the error signal, which the equalizer control function block 510 would process to obtain the control signal that adjusts the taps of the equalizer 480 until the error signal is at its minimum value.

The embodiment described above with reference to FIG. 18 enables the transmitter equalizer 640 to generate an eye that is as fast as possible in order to provide the maximum bias and modulation current levels that are allowed by the laser driver 30. The maximum bias and modulation current levels are set to ensure that the laser 40 is not overdriven.

It should be noted that the invention has been described with reference to a few illustrative embodiments and that the invention is not limited to these embodiments. For example, although the transceiver of the invention has been described as having particular components and configurations, the transceivers may include other components and have other configurations than those described herein. Those skilled in the art will understand that these and other modifications can be made to the invention and that all such modifications are within the scope of the invention.

What is claimed is:

1. A method for designing a fiber optic link intended to have a particular data rate, the link being designed to include at least first and second transceivers optically coupled to opposite ends of first and second optical fibers, respectively, the method comprising:

selecting a type of optical fiber to be used in the link based at least in part on whether a fiber of a particular type has an optical bandwidth that is sufficient for the intended particular data rate of the fiber optic link to ensure that the fiber itself will not be a limiting factor on the data rate of the link;

determining a length of the selected fiber type to be used as the fibers to which the transceivers will be coupled based at least in part on an effective modal bandwidth of the selected fiber type and on said particular data rate; and constructing first and second transmitters and first and second receivers for the first and second transceivers, respectively, wherein as part of constructing at least the first transmitter, a type of laser to be used in at least the first transmitter is selected based at least in part on whether a type of laser has a sufficiently low relative intensity noise (RIN), at least the first transmitter being constructed to include a laser of the selected laser type and a laser driver for delivering a drive signal to the laser of the selected laser type, wherein the particular data rate intended for the fiber optic link is higher than a data rate specified for the laser of the selected laser type that is included in at least the first transmitter.

2. The method of claim 1, wherein the type of laser is determined to have a sufficiently low RIN if the RIN is approximately equal to a RIN of a laser specified to have a data rate equal to said particular data rate.

3. The method of claim 1, wherein the type of laser is determined to have a sufficiently low RIN if the RIN is equal or lower than a RIN of a laser specified to have a data rate equal to said particular data rate.

4. The method of claim 1, wherein as part of constructing at least the first receiver, a type of receive equalizer to be used in the first receiver is selected from a plurality of receive equalizer types and at least the first receiver is constructed to include a receive equalizer of the selected receive equalizer type.

5. The method of claim 4, wherein the receive equalizer is selected from receive equalizer types that include a linear equalizer (LE) type and a decision feedback equalizer (DFE) type.

6. The method of claim 5, wherein as part of constructing at least the first transmitter, a type of transmit equalizer to be used in the first transmitter is selected and at least the first transmitter is constructed to include a transmit equalizer of the selected transmit equalizer type.

7. The method of claim 6, wherein the transmit equalizer type is a pre-distortion equalizer type.

8. The method of claim 4, wherein the receive equalizer type is an adaptive equalizer type.

9. The method of claim 8, wherein the receive equalizer of the adaptive equalizer type that is used in at least the first receiver performs an adaptive equalization algorithm that controls an equalization process performed by the receive equalizer.

10. The method of claim 9, wherein the adaptive equalization algorithm is performed in a burst-mode such that the equalization algorithm performed by the receive equalizer operates based on a predetermined duty cycle, the predetermine duty cycle including first time periods during which new error signals are generated by an error signal generation function circuit of the receive equalizer and including second time periods during which new error signals are not generated by an error signal generation function circuit of the receive equalizer, the error signals being used by the first receiver to control equalization of signals received over an optical channel associated with the first receiver.

11. The method of claim 10, wherein the error signals are used by parallel receivers to control equalization of signals over parallel optical channels.

12. The method of claim 1, wherein the particular data rate intended for the fiber optic link being designed is about at least twice as high as the data rate specified for the laser of the selected laser type that is included in at least the first transmitter.

13. A method for constructing a fiber optic link having a particular data rate, the method comprising:

constructing at least a first transmitter for a first transceiver and at least a second receiver for a second transceiver, wherein as part of constructing at least the first transmitter, a type of laser to be used in at least the first transmitters is selected based at least in part on whether a type of laser has a sufficiently low relative intensity noise (RIN), at least the first transmitter being constructed to include a laser of the selected laser type and a laser driver for delivering a drive signal to the laser of the selected laser type, wherein the particular data rate intended for the fiber optic link is higher than a data rate specified for the laser of the selected laser type that is included in at least the first transmitter; and optically coupling opposite ends of a first optical fiber to the first transmitter of the first transceiver and to the second receiver of the second transceiver, the first optical fiber being of a fiber type that has been selected to be used in the link based at least in part on whether a fiber of a particular type has an optical bandwidth that is sufficient for the intended particular data rate of the fiber optic link to ensure that the first optical fiber itself will not be a limiting factor on the data rate of the link, the first optical fiber having a length that has been selected based at least in part on an effective modal bandwidth of the selected fiber type and on said particular data rate.

14. The method of claim 13, wherein the type of laser is determined to have a sufficiently low RIN if the RIN is approximately equal to a RIN of a laser specified to have a data rate equal to said particular data rate.

15. The method of claim 13, wherein the type of laser is determined to have a sufficiently low RIN if the RIN is equal or lower than a RIN of a laser specified to have a data rate equal to said particular data rate.

16. The method of claim 13, wherein as part of constructing at least the first receiver, a type of receive equalizer to be used in the first receiver is selected from a plurality of receive equalizer types and at least the first receiver is constructed to include a receive equalizer of the selected receive equalizer type.

17. The method of claim 16, wherein the receive equalizer is selected from receive equalizer types that include a linear equalizer (LE) type and a decision feedback equalizer (DFE) type.

18. The method of claim 17, wherein as part of constructing at least the first transmitter, a type of transmit equalizer to be used in the first transmitter is selected and at least the first transmitter is constructed to include a transmit equalizer of the selected transmit equalizer type.

19. The method of claim 18, wherein the transmit equalizer type is a pre-distortion equalizer type.

20. The method of claim 16, wherein the receive equalizer type is an adaptive equalizer type.

21. The method of claim 20, wherein the receive equalizer of the adaptive equalizer type that is used in at least the first receiver performs an adaptive equalization algorithm that controls an equalization process performed by the receive equalizer.

22. The method of claim 21, wherein the adaptive equalization algorithm is performed in a burst-mode such that the equalization algorithm performed by the receive equalizer operates based on a predetermined duty cycle, the predetermine duty cycle including first time periods during which new error signals are generated by an error signal generation function circuit of the receive equalizer and including second time periods during which new error signals are not generated by an error signal generation function circuit of the receive equalizer the error signals being used by the first receiver to control equalization of signals received over an optical channel associated with the first receiver.

23. The method of claim 22, wherein the error signals are used by parallel receivers to control equalization of signals over parallel optical channels.

24. The method of claim 13, wherein the particular data rate of the fiber optic link is about at least twice as high as the data rate specified for the laser of the selected laser type that is included in at least the first transmitter.

* * * * *